United States Patent
Jeong et al.

(10) Patent No.: US 10,962,382 B2
(45) Date of Patent: Mar. 30, 2021

(54) METHOD FOR SETTING TARGET POINT AND METHOD FOR SETTING TRAVEL ROUTE OF VEHICLE

(71) Applicant: Hanwha Techwin Co., Ltd., Seongnam-si (KR)

(72) Inventors: Kyoung Jeon Jeong, Changwon-si (KR); In Zu Kang, Changwon-si (KR); Chang Hee Song, Changwon-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 334 days.

(21) Appl. No.: 15/943,771

(22) Filed: Apr. 3, 2018

(65) Prior Publication Data

US 2018/0224298 A1 Aug. 9, 2018

Related U.S. Application Data

(63) Continuation of application No. PCT/KR2016/003253, filed on Mar. 30, 2016.

(30) Foreign Application Priority Data

| Nov. 18, 2015 | (KR) | 10-2015-0162088 |
| Dec. 31, 2015 | (KR) | 10-2015-0191471 |
| Mar. 29, 2016 | (KR) | 10-2016-0037912 |

(51) Int. Cl.
*G06F 3/0486* (2013.01)
*G01C 21/36* (2006.01)
(Continued)

(52) U.S. Cl.
CPC ....... *G01C 21/3614* (2013.01); *G01C 21/367* (2013.01); *G01C 21/3664* (2013.01);
(Continued)

(58) Field of Classification Search
CPC .............. G01C 21/3614; G01C 21/367; G01C 21/3664; G06F 3/04883; G06F 3/04817; G06F 2203/04806; G06F 3/0486
See application file for complete search history.

(56) References Cited

U.S. PATENT DOCUMENTS

| 9,223,486 B2 | 12/2015 | Shin et al. |
| 2009/0046110 A1 | 2/2009 | Sadler et al. |

(Continued)

FOREIGN PATENT DOCUMENTS

| CN | 101784981 | 7/2010 |
| CN | 102428655 | 4/2012 |

(Continued)

OTHER PUBLICATIONS

International Search Report dated Aug. 4, 2016, in International Application No. PCT/KR2016/003253 (with English Translation).

*Primary Examiner* — Thomas G Black
*Assistant Examiner* — Ana D Thomas
(74) *Attorney, Agent, or Firm* — H.C. Park & Associates, PLC

(57) ABSTRACT

A method for setting a target point on an electronic map, the method performed by an electronic apparatus equipped with a display on which the electronic map is displayed and commands are input through touch, the method may include: sensing a selection of one point on the electronic map; displaying a selection icon on the electronic map; receiving an input of a magnification change command of the electronic map through a first touch; and adjusting the electronic map by expanding or contracting the electronic map with respect to the one point in accordance with the magnification change command and displaying the electronic map on the display, wherein at least the first touch may be continuously maintained during the sensing of the selection of the one (Continued)

point and the receiving of the input of the magnification change command.

19 Claims, 34 Drawing Sheets

(51) Int. Cl.
    *G06F 3/0488*     (2013.01)
    *G06F 3/0481*     (2013.01)

(52) U.S. Cl.
    CPC ...... *G06F 3/04817* (2013.01); *G06F 3/04883* (2013.01); *G06F 3/0486* (2013.01); *G06F 2203/04806* (2013.01)

(56) References Cited

U.S. PATENT DOCUMENTS

| | | |
|---|---|---|
| 2010/0289825 A1 | 11/2010 | Shin et al. |
| 2013/0229368 A1 | 9/2013 | Harada |
| 2015/0260525 A1 | 9/2015 | Parthasarathy |
| 2017/0026582 A1* | 1/2017 | Kim .................... H04M 1/0264 |
| 2019/0045135 A1* | 2/2019 | Ryu .................... H04N 5/23296 |

FOREIGN PATENT DOCUMENTS

| | | |
|---|---|---|
| JP | 2013-182543 | 9/2013 |
| KR | 10-2010-0068393 | 6/2010 |
| KR | 10-2010-0123475 | 11/2010 |
| KR | 10-2013-0029831 | 3/2013 |
| KR | 101307349 | 9/2013 |
| KR | 10-2015-0114068 | 10/2015 |

\* cited by examiner

METHOD FOR SETTING TARGET POINT AND METHOD FOR SETTING TRAVEL ROUTE OF VEHICLE

CROSS-REFERENCE TO RELATED APPLICATIONS

This application is a Continuation Application of International Patent Application No. PCT/KR2016/003253, filed on Mar. 30, 2016, and claims priority to and the benefit of Korean Patent Application No. 10-2015-0162088, filed on Nov. 18, 2015, Korean Patent Application No. 10-2015-0191471, filed on Dec. 31, 2015, and Korean Patent Application No. 10-2016-0037912, filed on Mar. 29, 2016, all of which are incorporated by reference for all purposes as if fully set forth herein.

BACKGROUND

Field

Exemplary embodiments of the invention relate generally to a method for setting a desired point (or a target point) on an electronic map and a method for setting a travel route of a vehicle and, more specifically to a method for setting a desired point and a method for setting a travel route of a moving vehicle, in particular, repeat the setting of the desired point for several times.

Discussion of the Background

Recently, active researches have been conducted on a vehicle, especially, an unmanned vehicle, and various forms of unmanned vehicles and techniques for controlling them have been developed. Further, various devices, such as tablets and smartphones is progressing, have been development to control the vehicles, in addition to the existing analog controllers. This enables the users to process more tasks, while operating the unmanned vehicle.

Generally, setting a waypoint refers to an operation of setting a point through which an unmanned vehicle passes along a designated route for an unmanned vehicle. The route along which the unmanned vehicle travels may be designated by interconnecting the waypoints. When the user sets the waypoint of the unmanned vehicle through the controller, the unmanned vehicle may travel along the generated travel route.

Since the waypoint of the unmanned vehicle is a main function in a protocol of operating the unmanned vehicle, the function of setting the waypoint is included in most controllers. Therefore, it is important to consider UI/UX such that the user can conveniently set the waypoint.

According to the conventional technique, when setting the waypoint on the map displayed on the controller or selecting an arbitrary point on the map, it is not easy to select an expansion and contraction operation of the map to select different points. In particular, when expanding/contracting the map, it is necessary to repeat the act of narrowing or widening the interval between the two fingers being touched, a so-called 'pinch-to-zoom action'. Further, when a desired arbitrary point is not located at the center in a display of the controller, there is also an inconvenience of locating the desired arbitrary point at the center again.

If the map is expanded in a state in which an arbitrary point is not located at the center, there is also a case where the point deviates from the display of the controller and may not be visible to the user. At this time, in order to locate the one point at the center again, the user needs to perform touch input again with the finger to move the map and repeat the pinch-to-zoom action again. Also, even after setting one waypoint, in order to designate the next waypoint, it is required to reduce the map again, and the pinch-to-zoom action needs to be repeated again. There are problems in which such processes not only cause in accuracy in operating the unmanned vehicles and also incur unnecessary time waste in controlling the vehicles. Such problems may also occur in the control of the mouse click on the computer.

The above information disclosed in this Background section is only for understanding of the background of the inventive concepts, and, therefore, it may contain information that does not constitute prior art.

SUMMARY

Methods according to exemplary embodiments of the invention is provided to facilitate for selecting an arbitrary point on an electronic map, setting waypoints via a controller, and generating a travel route for an unmanned vehicle.

According to one or more embodiments of the invention, a method for setting a target point on an electronic map, the method performed by an electronic apparatus equipped with a display on which the electronic map is displayed and commands are input through touch, the method may include: sensing a selection of one point on the electronic map; displaying a selection icon on the electronic map; receiving an input of a magnification change command of the electronic map through a first touch; and adjusting the electronic map by expanding or contracting the electronic map with respect to the one point in accordance with the magnification change command and displaying the electronic map on the display, wherein at least the first touch may be continuously maintained during the sensing of the selection of the one point and the receiving of the input of the magnification change command.

The method may further include: sensing a movement of a position of the selection icon displayed on the adjusted electronic map; and setting the target point on a basis of the movement of the selection icon.

The touch may be continuously maintained during the sensing of the selection of the one point, the receiving of the input of the magnification change command, and the sensing of the movement of the selection icon.

The receiving of the input of the magnification change command may include: displaying a magnification change region on the electronic map adjacent to the one point when sensing the selection of the one point; and receiving the magnification change command through the magnification change region.

The receiving of the input of the magnification change command may include: receiving a sliding touch input in which the first touch is moved continuously to the magnification change region while maintaining the touch, and wherein the adjusting of the electronic map may include: expanding the electronic map in response to sensing that the sliding touch input selects an expansion region of the magnification change region; contracting the electronic map in response to sensing that the sliding touch input selects a contraction region of the magnification change region; and stopping the expansion and contraction of the electronic map in response to the sliding touch input moving away from the magnification change region.

The adjusting of the electronic map may include, in response to the sliding touch input moving away from the magnification change region, the selection icon displayed on the adjusted electronic map is switched to a movement mode, and wherein the selection icon may be movable on the electronic map in the movement mode.

The setting of the target point may include, in response to releasing the touch input, setting a point at which the selection icon is finally located on the electronic map as the target point.

The sensing the selection of one point may include, in response to a plurality of touches executed together on the display, a plurality of commands being input together to the electronic apparatus.

The sensing the selection of one point may include: in response to sensing the first touch input on the display, selecting the detected point as the one point, and adjusting the electronic map may include: in response to sensing a second touch input, changing a magnification on the electronic map.

The receiving of the input of the magnification change command may include: displaying a magnification change region adjacent to the selected one point on the electronic map in response to sensing of the selection of the one point, and wherein the adjusting of the electronic map may include: expanding the electronic map in response to sensing the second touch input in an expansion region of the magnification change region; and contracting the electronic map in response to sensing the second touch input in a contraction region of the magnification change region.

The adjusting of the electronic map may include, in response to the second touch input not being applied for a predetermined time or more, switching the selection icon displayed on the adjusted electronic map to a movement mode, the selection icon may be movable on the electronic map.

The receiving of the input of the magnification change command may include: expanding and contracting the electronic map in response to the selected one point touched on the display is pressurized with a pressure equal to or lower than a first reference pressure or equal to or higher than a second reference pressure.

The receiving of the input of the magnification change command may include: in response to the touch being maintained at a pressure between the first and second reference pressure for a time longer than a certain reference time, switching the selection icon displayed on the adjusted electronic map to a movement mode, the selection icon being movable on the electronic map in the movement mode.

The setting of the target point may include: automatically expanding or contracting the electronic map back to a magnification of the electronic apparatus before setting the target point is performed.

According to one or more exemplary embodiments of the invention, a method for setting a target point on an electronic map, the method performed by an electronic apparatus equipped with a display on which the electronic map is displayed and a command is input via a touch, the method may include: sensing a selection and a movement of one point on the electronic map; displaying a first region for receiving a command for moving the one point and for sensing a return from a magnification change command input, and a second region for receiving a command for changing a magnification of the electronic map, the first region and the second region displayed adjacent to each other on the display, on a basis of the position of the detected one point; changing the magnification of the electronic map on the basis of the position of the one point in accordance with the input of the command sensed in the second region, and displaying the electronic map on the display at the changed magnification; and stopping a magnification change when a command input to the second region returns to the first region and is sensed in the first region.

The method may further include: moving a selection icon displayed on the electronic map in accordance with the sensed movement in response to sensing the touch input in the first region; and setting the target point on a basis of a final position at which the selection icon is moved on the display.

The at least one touch is continuously maintained during the sensing of the selecting of the one point in response to the movement of the selection icon on the display.

The first region is displayed at a position corresponding to the selected one point, and the second region is displayed at a position adjacent to the first region.

According to yet another exemplary embodiment of the invention, a method for setting a target point on an electronic map, the method performed by an electronic apparatus equipped with a display on which the electronic map is displayed and a command is input through the touch, the method may include: receiving a touch input of the electronic map indicating a touched region; adjusting the electronic map by expanding or contracting the electronic map with respect to the touched region in accordance with receiving a magnification change command and displaying the electronic map on the display; and sensing movement of a position of a selection icon displayed on the adjusted electronic map, wherein at least one touch may be continuously maintained, during receiving the touch input corresponding to the magnification change command, displaying the electronic map on the display, and sensing the movement of the position of the selection icon.

The receiving of the input of the magnification change command may include: receiving touch inputs from two fingers held on the display and sensing the input of the magnification change command, in response to the touch inputs from the two fingers; and switching to movement mode, in response to sensing a release of at least one of the touch inputs of the two fingers to sensing a movement of a relative position of the selection icon.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
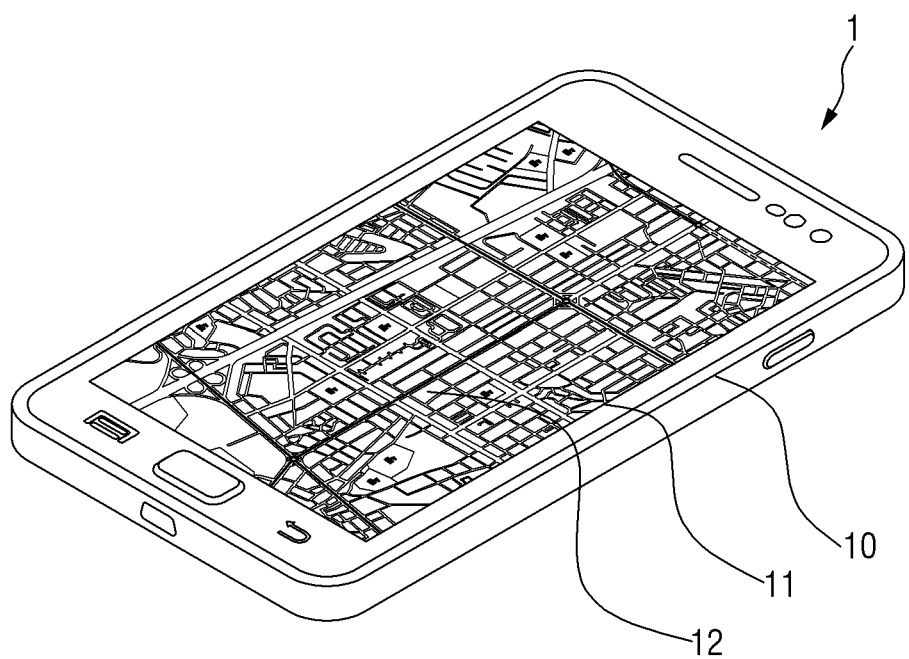
FIG. 1A is a perspective view of an electronic apparatus 1 according to the exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1A is a perspective view of an electronic apparatus 1 in which an exemplary embodiment of the may be provided.

According to the method for setting the desired point (or a target point) of the exemplary embodiment, an electronic map 12 is displayed by the electronic apparatus 1 so that a desired point can be selected on the electronic map 12. According to the method for setting a travel route of a vehicle of the exemplary embodiment, a plurality of the above-mentioned desired points are selected so that a waypoint is formed in the selected order and the travel route of the vehicle is set. The electronic apparatus 1 includes a main body 10, a display 11 for displaying a screen, and an electronic map 12 displayed through the display 11. The electronic apparatus 1 include apparatuses for providing touch functions, such as a smartphone, a tablet PC, a touch screen Laptop, and a navigation. However, the exemplary embodiments are not limited thereto, and the electronic apparatus 1 may include as apparatus as long as it is capable of providing a touch function.

The display 11 may include a touch sensor to provide the touch function. In this case, the user may directly input the touch signal via the display 11. However, the exemplary embodiments are not limited thereto, and the electronic apparatus 1 may include a touch pad that provides a touch function if the display 11 does not provide a touch function.

The electronic map 12 may refer to various maps that can be displayed as an image via the display 11 included in the electronic apparatus 1. The electronic map 12 may include electronic maps provided on the Web or mobile in the conventional portal site, electronic maps provided on mobile from the mobile application vendor, electronic maps 12 provided in the navigation device by the navigation vendor, and others various types of electronic maps.

Figure 1B:
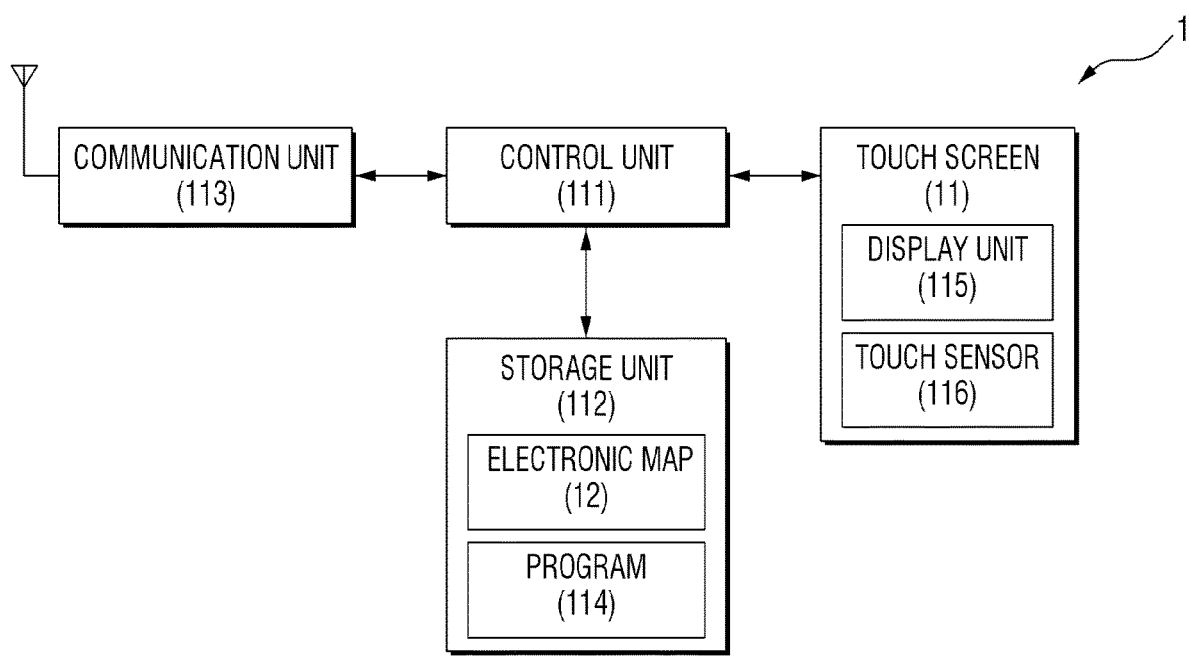
FIG. 1B is a block diagram illustrating the detailed configuration of the electronic apparatus 1 of FIG. 1A.

FIG. 1B is a block illustrates an exemplary configuration of the electronic apparatus 1 illustrated in FIG. 1A. As illustrated in the drawings, the electronic apparatus 1 may be configured to include a control unit 111, a display/touch screen 11, a storage unit 112, and a communication unit 113.

The control unit 111 controls the overall operation of the mobile communication electronic apparatus 1. For example, the control unit 111 performs a process and a control for voice communication and data communication, and control the display unit 115 to display the processing result on the electronic map 12 according to the exemplary embodiment, in response to the number of times, position, strength of touch input of the user transmitted via the touch sensor 116, the time interval between touches and the like, in addition to the conventional function. Further, the control unit 111 can control the travelling operation of the vehicle, by transmitting the processing result or the control command of the vehicle to the vehicle.

The touch screen 11 is configured to include a display unit 115 and a touch sensor 116. The display unit 115 displays various kinds of information relating to the status and operation of the electronic apparatus 1, and displays the processing result of the electronic map 12 executed by the control unit 111.

The touch sensor 116 is integrally mounted together with the display unit 115, senses the touch generated from the display unit 115 to detect the coordinates of the region in which the touch is generated, the number of times, the strength or the like of touch, and provides the detected result to the control unit 111.

The storage unit 112 stores a program 114 for processing and controlling the operations of the electronic apparatus 1, various data generated during execution of each program, and the electronic map 12 acquired via various routes (irrespective of online and offline) inside the electronic apparatus 1.

The communication unit 113 transmits and receives a radio signal via an antenna. For example, the communication unit 113 modulates the signal from the control unit 111 and performs frequency-up-converting, transmits the signal via an antenna, or performs frequency-down-conversion and demodulation of the radio signal received through the antenna, and provides the radio signal to the control unit 111. In such a procedure, the communication unit 113 may download the electronic map 12 from the outside or may transmit the processing result and the control command in the control unit 111 to the vehicle.

In exemplary embodiments, the control unit 111, the storage unit 112, the communication unit 113, and the touch screen 11, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the control unit 111, the storage unit 112, the communication unit 113, and the touch screen 11, and/or one or more components thereof may include or otherwise be associated with one or more memories (not shown) including code (e.g., instructions) configured to cause the control unit 111, the storage unit 112, the communication unit 113, and the touch screen 11, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

The electronic apparatus 1 of FIGS. 1A and 1B illustrated to include a display including a touch sensor, that is, a touch screen. However, according to the exemplary embodiments, the electronic apparatus 1 may have an environment such as a general PC or laptop equipped with a display and a separate mouse interface, without including a touch screen.

Figure 2:
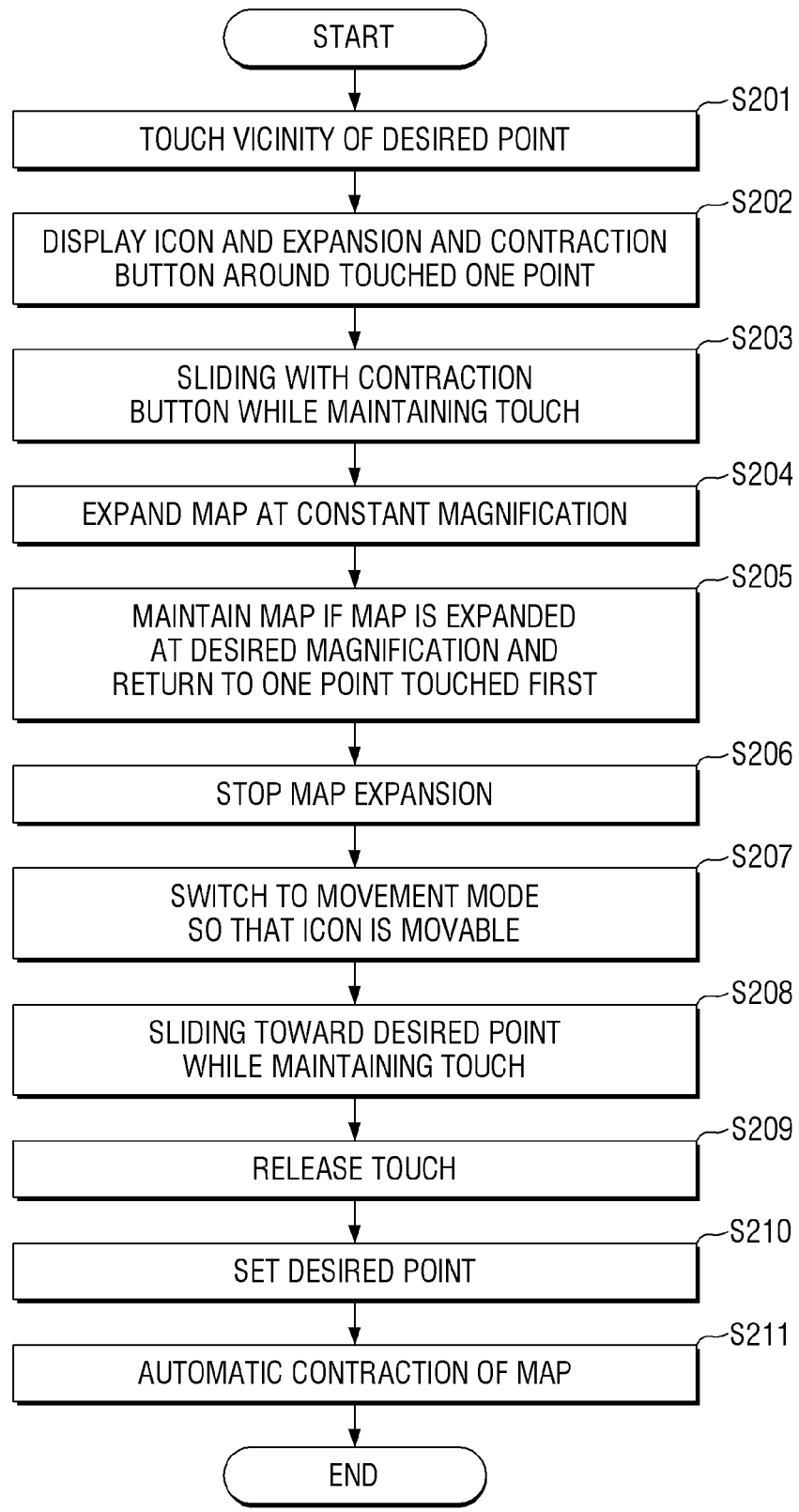
FIG. 2 is a flowchart illustrating a method for setting a desired point (or a target point) and a method for setting a travel route of a vehicle, including a magnification change mode and a movement mode according to a first exemplary embodiment.

FIG. 2 is a flowchart illustrating the method for setting the desired point and the method for setting the travel route of the vehicle, including a magnification change mode and a movement mode, according to a first exemplary embodiment.

In the specification, the expression 'setting the desired point' may refer to selection of points for acquiring information about buildings, bridges, and other structures displayed on the electronic map 12, and also a selection of a point (for example, a waypoint) to which the vehicle tries to reach. Hereinafter, each step of the flowchart of FIG. 2 will be described with reference to FIGS. 3, 4, 5, 6, 7, 8, 9, and to 10.

Figure 3:
FIG. 3 illustrates a state of applying a touch input on the electronic map 12 in order to execute a method for setting the desired point and the method for setting the travel route of the vehicle according to the first exemplary embodiment.

FIG. 3 is illustrates a state of applying a touch input on the electronic map 12 in order to execute the method for setting the desired point and the method for setting the travel route of the vehicle according to the first exemplary embodiment.

In order to set a desired point according to the first exemplary embodiment, as illustrated in FIG. 3, the user touches a vicinity of a desired point on the electronic map 12 (S201). In this specification, a touch using a finger is exemplified, but the exemplary embodiments are not limited thereto, and it is also possible to touch the electronic apparatus 1, using a tool such as a stylus pen.

Moreover, the expression 'the user touches the vicinity of the desired point' includes not only a case where the user intentionally touches the vicinity of the desired point, but also a case where the user tried to touch the desired point, but the user touches a point different from the desired point. This may be due to the map not being sufficiently zoomed in, and it is difficult to make such fine selection with the finger having relatively larger contact area.

Figure 4:
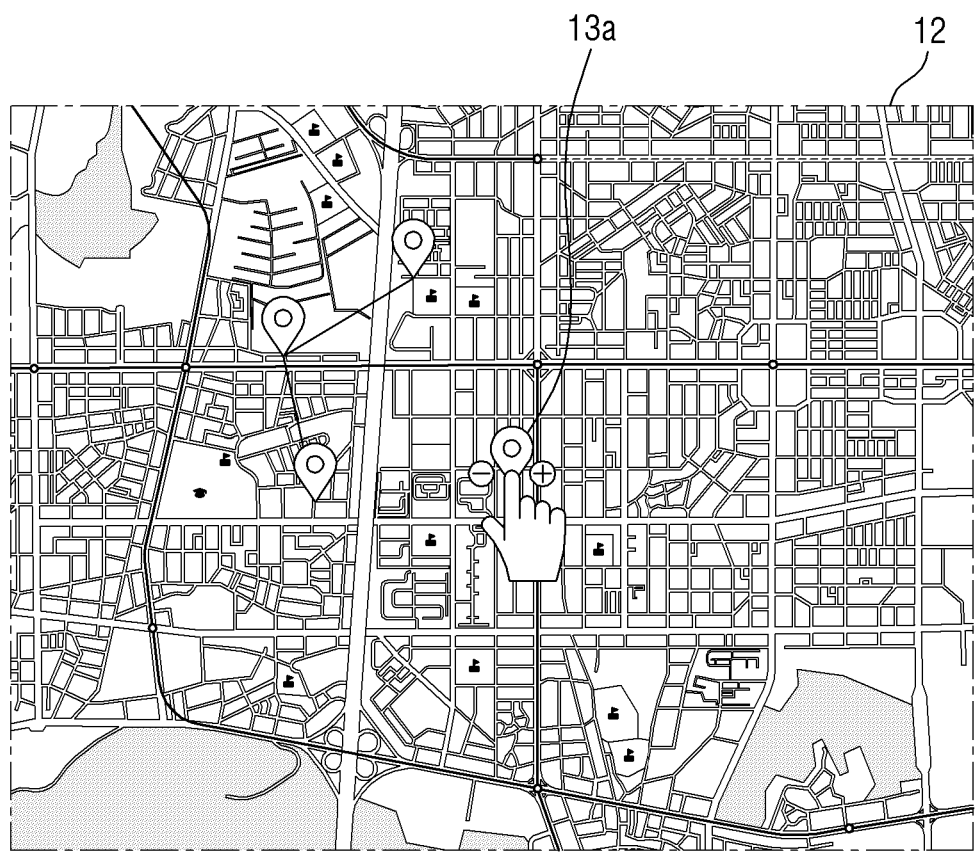
FIG. 4 illustrates an icon displayed on the electronic map according to the first exemplary embodiment.
Figure 5A:
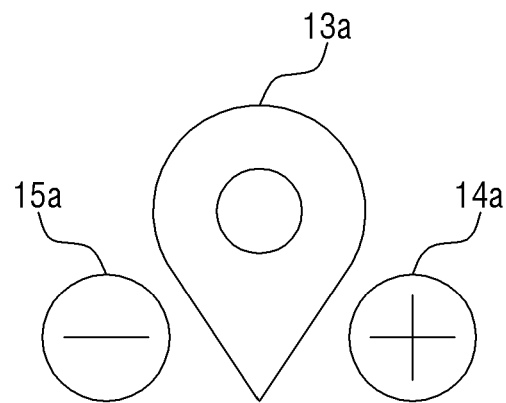
FIGS. 5A, 5B, and 5C illustrate examples of the icon including magnification change regions according to the first exemplary embodiment.
Figure 5B:
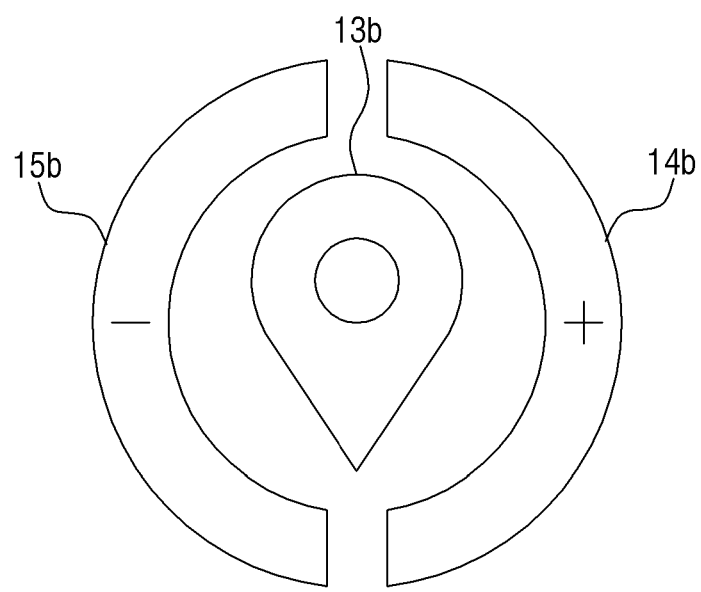
Figure 5C:
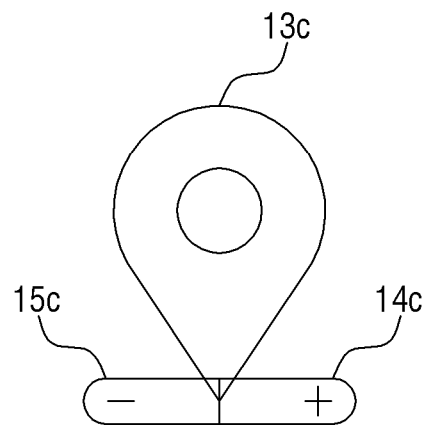

FIG. 4 is illustrates an icon 13 displayed on the electronic map 12 according to the first exemplary embodiment, and FIGS. 5A, 5B, and 5C illustrates examples of the icon 13a including magnification change regions 14a and 15a according to the first exemplary embodiment.

When the user touches one point, as illustrated in FIG. 4, the icon 13 including the icon 13a and the magnification change regions 14a and 15a are displayed around the touched the one point (S202). When the user touches the one point, it is desirable that the icon 13a be displayed on an upper side the one point so that the icon 13a is easily visible to the user. If the icon is displayed on the left, right or lower side of the one point, the icon 13a may be hidden by the user's hand when the user touches with the finger. For example, the icon 13a may have a sharp shape in which one side (in particular, the lower side) protruding from a generally rounded circular, so that the icon 13a can accurately indicate the one point touched by the user.

According to the exemplary embodiments including the first exemplary embodiment, the user may select one point on the electronic map by a long touch on one point on the electronic map. For example, if the touch of the user's finger is maintained for a predetermined time, for example, 0.5 seconds or longer, it is recognized as a long touch and the selection of one point is completed. According to the exemplary embodiment, the long touch for selecting the one point may be sufficiently distinguished from an unintended touch and drag performed by the user on the electronic map, and an erroneous recognition may be prevented or reduced from the touch for selecting the one point.

The user can set an accurate desired point, by moving the icon 13a after expanding (or zooming in) or contracting (or zooming out) the electronic map 12, using the magnification change icons 14a and 15a. As illustrated in FIG. 4, the icon 13a may be displayed on the electronic map 12 at the same time when the user touches and selects one point, and the icon may also be displayed after the user performs expansion or contraction of the electronic map 12. The icon 13a may already be displayed before the user touches the one point. In other words, the one point on the electronic map 12 may be selected when the user touches the one point of the electronic map 12. The icon 13a may be displayed as a result of searching of name, address or telephone number by the user and selecting one point on the electronic map.

Therefore, the exemplary embodiments do not restrict when and how the icon 13a is displayed on the electronic map 12, and the icon 13a may be displayed on the electronic map 12 at any time before the icon 13a is moved so that the user accurately selects the desired point.

The magnification change regions 14a and 15a refer to regions in which the magnification change command can be input so that the user can expand or contract the electronic map 12. The magnification change regions 14a and 15a include an magnification region 14a in which the user can expand the electronic map 12, and a contraction region 15a in which the user can contract the electronic map 12.

As illustrated in FIGS. 5A and 5B, the magnification change regions 14a, 15a, 14b, and 15b according to the first exemplary embodiment may be areas displayed as two buttons separately formed on the left and right sides of the icons 13a and 13b. One of the two magnification change regions may perform a function as expansion regions 14a and 14b, and the other button may perform a function as contraction regions 15a and 15b. As Referring to FIG. 5A, the two magnification change regions 14a and 15a may each have a rounded circular shape. Referring to FIG. 5B, the two magnification change regions may also have a shape which surrounds the icon 13a. The two magnification change regions do not need to be necessarily disposed on the left and right sides of the icon 13a, but may be disposed on the upper and lower sides or in other directions. Referring to FIG. 5C, the magnification change regions 14c and 15c may also be disposed within one region on the lower side of the icon 13c by being divided in the left and right directions.

Figure 6:
FIG. 6 is illustrates a state of expanding the electronic map according to the first exemplary embodiment.

FIG. 6 is illustrates a state of expanding the electronic map 12 according to the first exemplary embodiment.

In order to expand the electronic map 12, as illustrated in FIG. 6, the user, while maintaining the touch with the finger, moves the touched finger to slide toward the expansion region 14a (S203). The electronic apparatus 1 starts expanding the electronic map 12 in response to sensing the sliding of the finger to the expansion region 14a. The during the time at which the finger maintains the touch on the expansion region 14a, each time the predetermined time interval elapses, the electronic map 12 is expanded by a predetermined magnification increment for elapse of every predetermined time interval that the finger maintains the touch on the expansion region 14a (S204). For example, the predetermined time interval may be about 0.3 to 0.5 seconds, but the exemplary embodiments are not necessarily limited thereto. Further, the predetermined magnification increment may be arbitrarily changed or modified by the user. Further, for the sake of convenience of the user, the power of magnification of the current electronic map 12 may be displayed around the magnification change regions 14a and 15a as illustrated in FIG. 6.

The electronic map 12 according to the first exemplary embodiment is expanded on the basis of (or with respect to) the one point selected by the user. In the above-mentioned expansion on the basis of the one point, when the electronic map 12 is expanded at a predetermined magnification, the one point may be the center of expansion. When the electronic map 12 is expanded, a part of the electronic map 12 disappears on the display 11. However, as described above, when the selected one point is the center of expansion of the electronic map, even if the map is expanded, the one point is maintained at the same position without being deviated from the display 11 of the electronic apparatus 1. Therefore, a case where the one point is not displayed on the display 11 after expansion of the electronic map 12 does not occur. In another example, the electronic map 12 may also be expanded after the one point moves to the center on the display 11. According to the present exemplary embodiment, in order to improve the user's recognizability, the size and positions of the icon 13a and the magnification change regions 14a and 15a may not be changed, even while the electronic map 12 is expanded.

Figure 7:
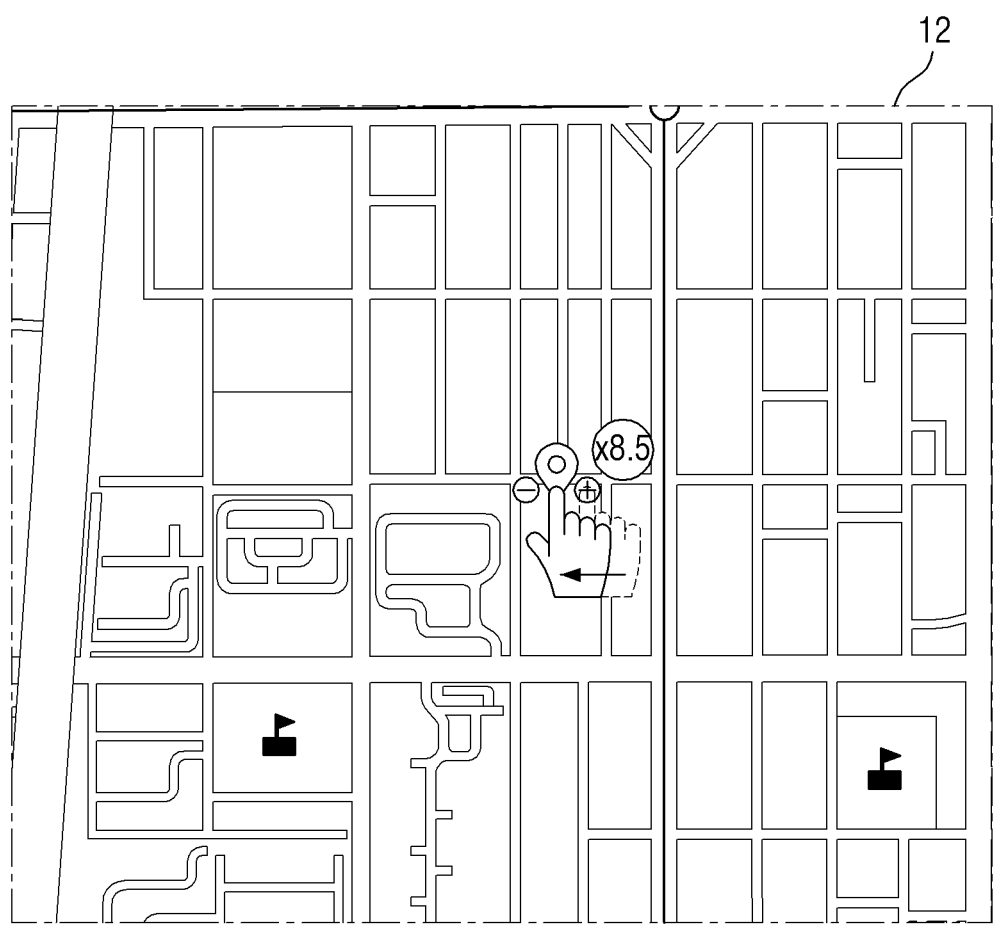
FIG. 7 is illustrates a state of stopping the expansion of the electronic map according to the first exemplary embodiment.

FIG. 7 is illustrates a state of stopping the expansion of the electronic map 12 according to the first exemplary embodiment.

In order to stop the expansion after the user expands the electronic map 12 at the desired magnification, as illustrated in FIG. 7, the user may slide the finger, which was maintaining the touch in the expansion region 14a, away from the region 14a (S205). The expansion of the electronic map 12 is stopped by the operation of S205 (S206).

In this manner, the expansion of the electronic map 12 may be stopped just by sliding the touching finger away from the magnification change region 14a. However, to switch to the movement mode, a virtual returning region may be defined at a position which does not overlap the magnification change region 14a, for example, near the one point touched initially. As it will be described later, when a predetermined time elapses after the user's finger enters the returning region, the icon may be switched to a mode (a movement mode) in which the user can move the icon 13a for selecting an accurate point.

After the electronic map 12 has been expanded, the one point and the desired point can be clearly identified on the electronic map 12. If the user fails to accurately capture the timing to stop the expansion, the magnification may differ from the desired magnification. If the electronic map 12 is expanded to a lesser extent than the desired magnification, the finger moved away from the expansion region 14a may be slid back toward the expansion region 14a. Then, the stopped expansion proceeds again and the electronic map 12 is expanded again.

If the electronic map 12 is expanded to a greater extent than the desired magnification, the finger maintaining the touch on the expansion region 14a may be slid toward the contraction region 15a, and the electronic map 12 may be gradually contracted according to the time that the finger maintains the touch in the contraction region 15a.

On the other hand, if the electronic map 12 is expanded to a greater extent than the desired magnification and the desired point is not displayed on the display 11, it is also possible to set a desired point by moving the expanded electronic map 12. The detailed contents thereof will be described later.

Figure 8:
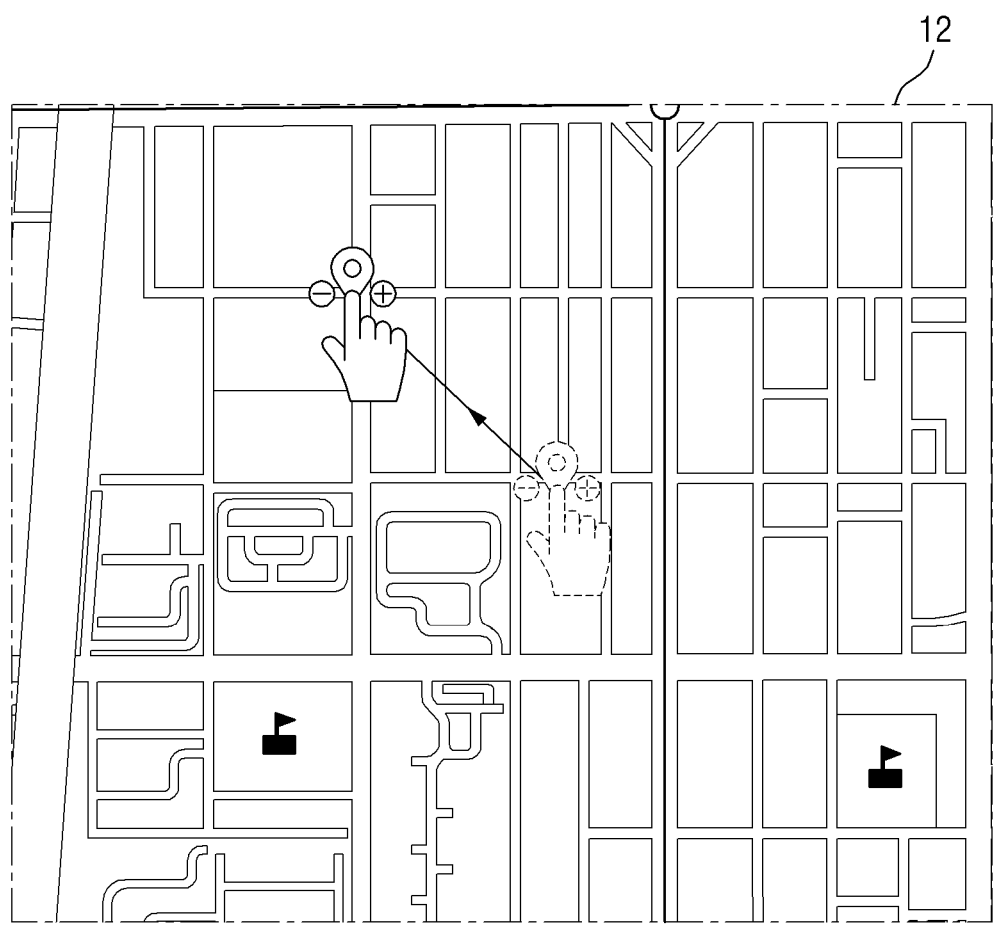
FIG. 8 is illustrates a state of moving the icon on the electronic map according to the first exemplary embodiment.

FIG. 8 is illustrates a state in which the icon 13a is moved on the electronic map 12 according to the first exemplary embodiment.

After the electronic map 12 is expanded at the magnification desired by the user, and after the finger maintaining the touch on the expansion region 14a slides to the returning region, when the predetermined time elapses, the icon is switched to the movement mode such that the icon 13a is movable (S207). In the present specification, the predetermined time may be about 0.5 seconds to 1 second, but exemplary embodiments are not limited thereto. In order to distinguish the icon 13a switched to the movement mode from the icon 13a of the magnification change mode, the shape or color of the icon 13a may be changed.

If the electronic map 12 is displayed on the display 11 at the magnification desired by the user from the beginning, without sliding the finger to the magnification change regions 14a and 15a, maintaining the touch on the icon 13a for a predetermined time may switch the icon 13a from the magnification change to the movement mode.

Furthermore, if the touch is maintained after the icon 13a is switched to the movement mode without movement, the icon may be switched back to the magnification change mode again. Detailed contents thereof will be described later.

The icon 13a switched to the movement mode may be moved in accordance with the movement of the finger sliding while maintaining the touch. That is, the user can move the icon 13a with the finger. Therefore, in order to set the desired point according to the first exemplary embodiment, as illustrated in FIG. 8, the user may slide the finger toward the above-mentioned desired point, while maintaining the touch with the finger. For another example, when a predetermined time elapses after the touch of the finger enters the return region, the icon 13a is fixed, and meanwhile, the electronic map 12 may be activated to be movable. In this case, the user may relatively move the electronic map 12 so that the fixed icon 13a indicates the desired point. On the other hand, if the icon 13a is activated to be movable and the magnification of the electronic map 12 is sufficiently changed such that a desired point can be set, since there is no need to further perform the expansion or contraction, the magnification change regions 14a and 15a may disappear.

When the movement to the desired point (the direct movement of the icon 13a or the movement of the electronic map 12 in the opposite direction) is completed through the above-described movement mode, and protruded one side of the icon 13a indicates the desired point, the user releases the touch (S209), and thus, the desired point can be finally set (S210).

Figure 9:
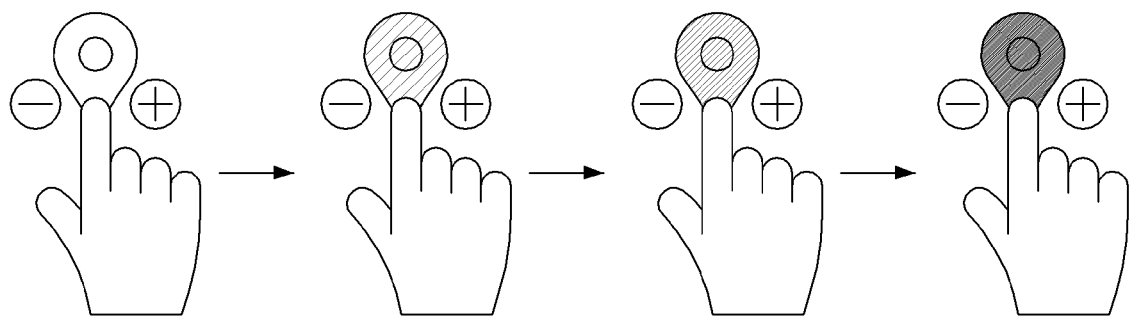
FIG. 9 is illustrates a process in which the icon according to the first exemplary embodiment is switched from a movement mode into a magnification change mode again.

FIG. 9 is illustrates a procedure in which the icon 13a according to the first exemplary embodiment is switched to the magnification change mode from the movement mode again.

As described above, when the touch is maintained after the icon 13a is switched to the movement mode for the predetermined time without movement, the icon may be switched back to the magnification change mode again. As illustrated in FIG. 8, when the finger moves, while maintaining the touch, the icon 13a switched to the movement mode moves in accordance with the movement of the finger. Thereafter, when the touch of the finger is released, the point indicated by the icon 13a is finally set to a desired point. However, the user may want to switch to the magnification change mode again, after the user moves the icon.

Specifically, as illustrated in FIG. 9, after the icon 13a is switched to the movement mode, when the touch is maintained without movement, and the color of the icon 13a starts to change. The color changes for a predetermined number of times at a predetermined time interval, and when the color changes for a predetermined number of times, the icon 13a switches to the magnification change mode again. Furthermore, the color may gradually change to a darker color from a lighter color to emphasize and indicate the user that the icon 13a will switch to the magnification change mode from the movement mode soon. In the present exemplary embodiment, the predetermined time interval may be 0.25 second to 0.5 second, and the number of times of color change may be 3 to 6 times, but the exemplary embodiments are not necessarily limited thereto. It is also possible to change the shape of the icon 13a instead of changing the color.

After switching to the magnification change mode, if the user's finger slides to the magnification change region while maintaining the touch with the finger, the electronic map 12 is expanded or contracted. The expansion or contraction of the electronic maps 12 may be performed by repeating the above-described steps S203, S204, S205, S206, and S207.

Figure 10:
FIG. 10 is illustrates a state in which setting of a desired point according to the first exemplary embodiment is completed.

FIG. 10 is illustrates a state in which setting of a desired point according to the first exemplary embodiment is completed.

When the setting of the desired point according to the first exemplary embodiment is completed, as illustrated in FIG. 10, the electronic map 12 can be automatically contracted at a specific magnification (S211). The specific magnification may be, for example, a magnification when the user applies a touch input to the electronic apparatus 1 so as to set a desired point at the beginning. Or, the specific magnification may be a magnification enough to display all the desired points on the display. Since the electronic map 12 is automatically contracted at a predetermined magnification after the desired point is set in this manner, the user can prepare for setting the next desired point, while checking all the preset desired points at a glance.

The desired point according to the first exemplary embodiment can be set, through the method of the aforementioned steps S201, S202, S203, S204, S205, S206, S207, S208, S209, S210, and S211. At this time, the series of procedures from the selection of the one point to the setting of the desired point is performed while maintaining the touch of the user's finger on the display 11 of the electronic apparatus 1. Therefore, it is possible to reduce an inconvenience involved in repeating the act of repetitively performing a plurality of times of touch and release of touch on the display 11, or the act of closing or opening the two fingers in order to perform the expansion or contraction.

Furthermore, the method for setting the desired point through the above-described procedure may be utilized as a method for setting a plurality of waypoints for executing the method for setting the travel route of the vehicle according to the first exemplary embodiment. For example, the user may set a plurality of waypoints by repeating the methods of the aforementioned steps S201, S202, S203, S204, S205, S206, S207, S208, S209, S210, and S211. The user can designate the travel route of the vehicle along the plurality of waypoints sequentially set in this way.

On the other hand, according to the method for setting the travel route of the vehicle according to the first exemplary embodiment, the number (not illustrated) indicating the order of the currently designated waypoint may be displayed on the icon 13a. For example, in the situation in which three (3) waypoints have already been set in the process of setting the travel route of the vehicle, if the aforementioned steps S201, S202, S203, S204, S205, S206, S207, S208, S209, S210, and S211 are performed to set the next waypoint, the number '4' is displayed on the icon 13a.

Also, each time the waypoint of the vehicle is set, the distance for each waypoint and the distance of the total travel route or the latitude and longitude of the set waypoint may be displayed on the display 11. If the vehicle is a flying vehicle, the appropriate altitude at which the aircraft is suitable for flight may be further displayed.

In this manner, the desired point or the plurality of waypoints according to the first exemplary embodiment may be set through the aforementioned steps S201, S202, S203, S204, S205, S206, S207, S208, S209, S210, and S211, and the travel route of the vehicle can be designated accordingly.

Figure 11A:
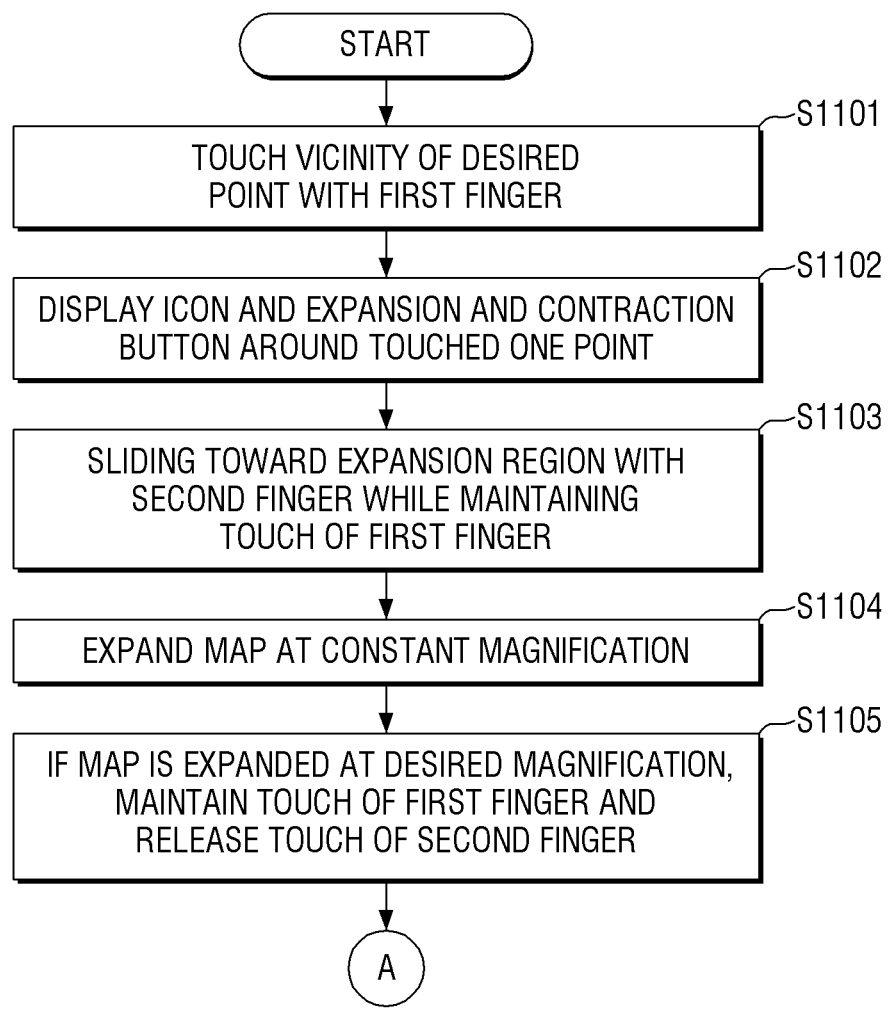
FIGS. 11A and 11B are flowcharts illustrating a method for setting a desired point according to a second exemplary embodiment.
Figure 11B:
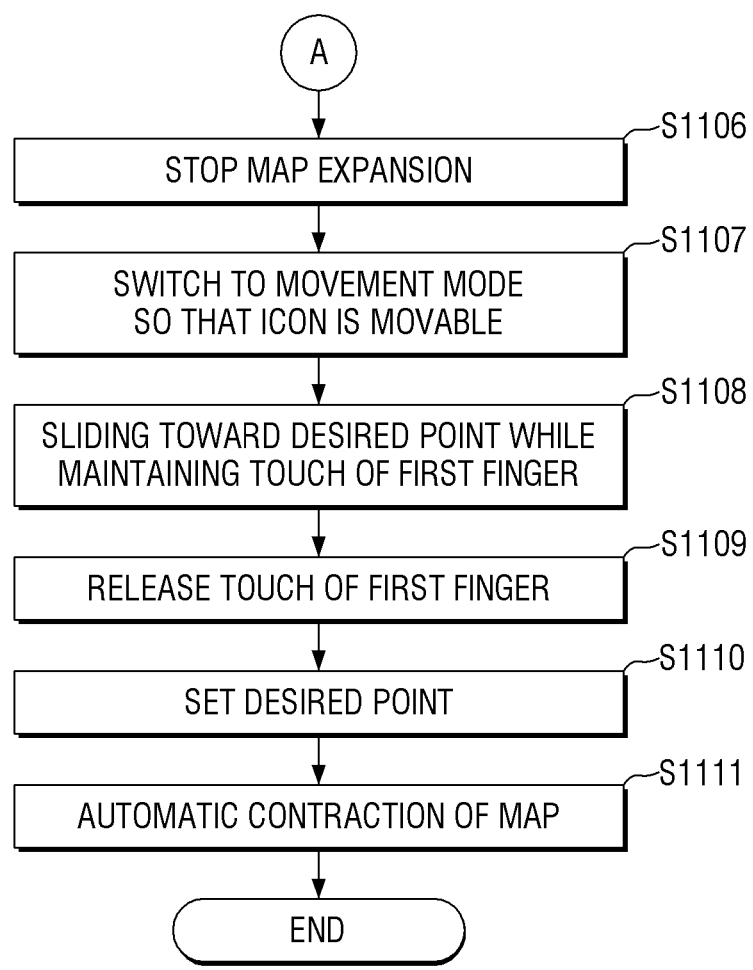
Figure 12:
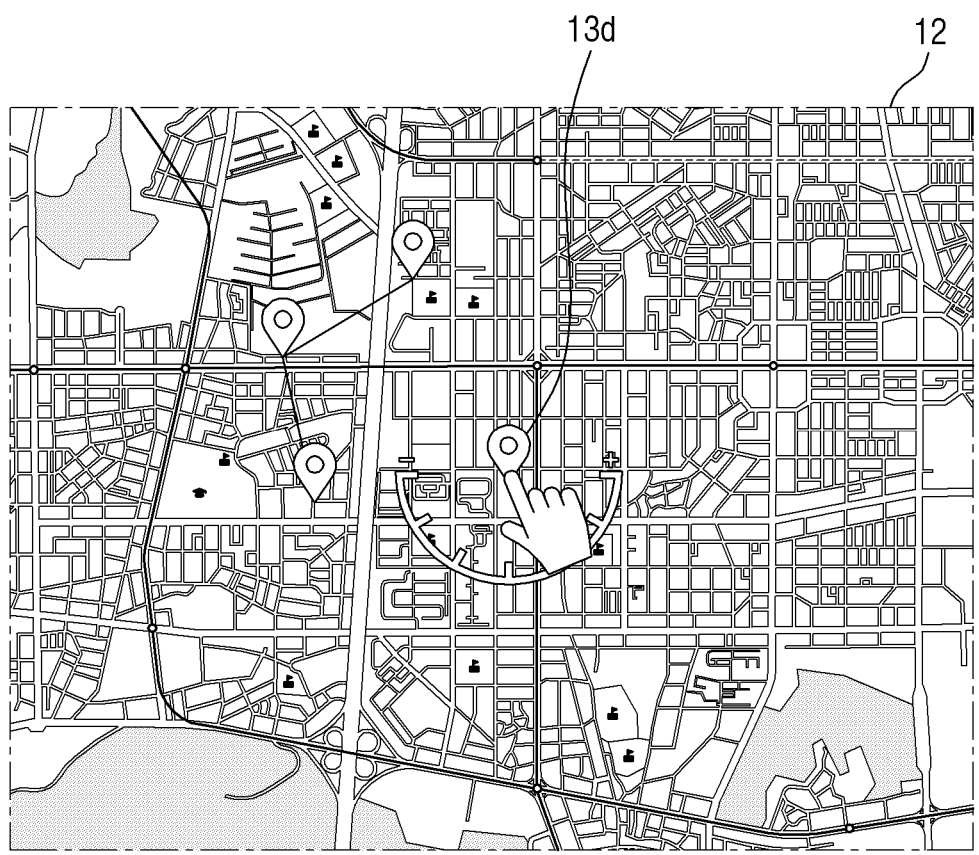
FIG. 12 is the icon and the magnification change regions displayed on the electronic map according to a second exemplary embodiment.

FIGS. 11A and 11B are flowcharts illustrating a method for setting a desired point according to the second exemplary embodiment. According to this method, as illustrated in FIG. 12, a plurality of fingers is used to change the magnification of the electronic map 12. In the following description of the second exemplary embodiment, redundant description of the same parts as those in the first exemplary embodiment described above will be omitted, and the different parts will be mainly described. Hereinafter, the steps of the flowchart of FIGS. 11A and 11B will be described with reference to FIGS. 12, 13, and 14.

Figure 13:
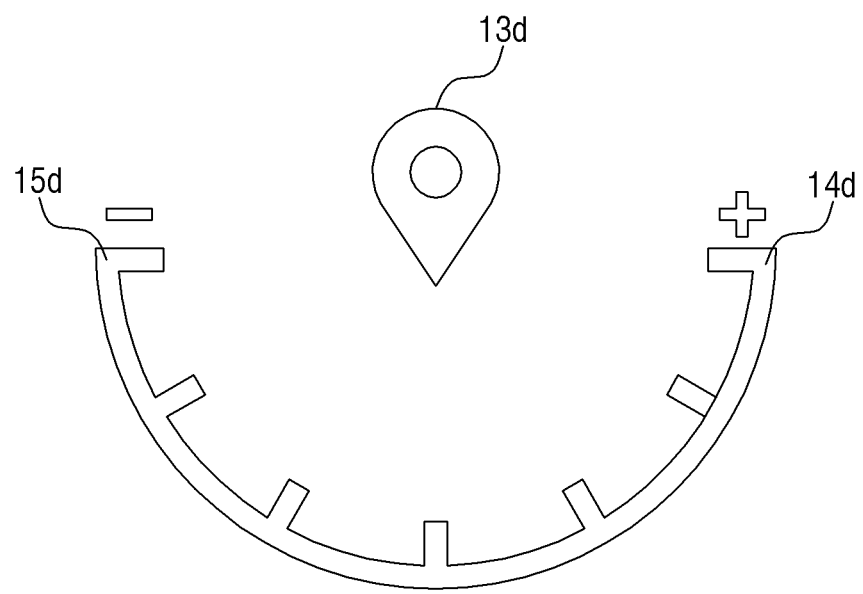
FIG. 13 illustrates the icon displayed on the electronic map according to the second exemplary embodiment.

FIG. 12 illustrates an icon 13d and magnification change regions 14d and 15d displayed on an electronic map 12 according to the second exemplary embodiment, and FIG. 13 is illustrates a specific form of the displayed icon 13d displayed on the electronic map 12.

When the user touches the vicinity (one point) of the desired point on the electronic map 12 with the first finger (S1101), as illustrated in FIGS. 12 and 13, the icon 13d and the magnification change regions 14d and 15d are displayed around the touched one point (S1102).

The magnification change regions 14d and 15d are regions in which the magnification change command can be input by the user's touch so that the electronic map 12 can be expanded or contracted. The magnification change regions 14d and 15d may be formed as an image connected by a single piece (illustrated as substantially a semi-circular form in FIG. 13) including an expansion region 14d in which the user is capable of expanding the electronic map 12, and a contraction region 15d in which the user is capable of contracting the electronic map 12.

According to the second exemplary embodiment, in touch for selecting the one point, the user may used one finger among the four fingers other than the thumb. Further, in touch of the magnification change regions 14d and 15d, the user may use the thumb. According to the exemplary embodiment, the magnification change regions 14d and 15d may be disposed and displayed below the icon 13d as illustrated in FIG. 12 for convenience of using the thumb, but the exemplary embodiments are not necessarily limited thereto. The user may choose to use any finger depending on the arrangement of the magnification change regions 14d. For user's convenience, the electronic apparatus may change between a left-handed mode or a right-handed mode. When selecting the left-handed mode, the magnification change regions 14d and 15d are formed on the right side of the icon 13d, and when selecting the right handed mode, the magnification change regions 14d and 15d may be formed on the left side of the icon 13d.

Figure 14:
FIG. 14 is illustrates the state of expanding the electronic map according to the second exemplary embodiment.

FIG. 14 is illustrates an operation of expanding the electronic map 12 according to the second exemplary embodiment. In order to expand the electronic map 12 according to the second exemplary embodiment, as illustrated in FIG. 14, the user's second finger may slide toward the expansion region 14d, while maintaining the first finger at the touched one point (S1103). for example, the second finger may slide naturally as a hand pivots with the point touched by the first finger as an axis.

However, the exemplary embodiments are not limited thereto, and various methods may be used as long as the second finger may keep the touch and slide, while the first finger is maintained. When the electronic apparatus 1 senses maintenance of the touch of the first finger and the sliding of the second finger, the electronic apparatus 1 starts to expand the electronic map 12. After the second finger slides, during the time when the second finger maintains the touch on the expansion region 14d, every time the predetermined time interval elapses at a predetermined time interval, the electronic map 12 is expanded by a predetermined magnification increment (S1104).

In particular, as illustrated in FIG. 14, the predetermined magnification increment may vary in accordance with the sliding distance of the second finger. For example, when the second finger is touched from the vicinity of the boundary between the expansion region 14d and the contraction region 15d according to the second exemplary embodiment, if the sliding distance is short, the magnification increment by which the electronic map 12 is expanded may be set to be small, and if the sliding distance is long, the magnification increment by which the electronic map 12 is expanded may be set to be large. Since scales may be formed in the magnification change regions 14d and 15d, and the user can easily grasp the distance at which the second finger slides. The electronic map 12 according to the second exemplary embodiment is expanded on the basis of one point selected by the user.

After the electronic map 12 is expanded at a magnification desired by the user, the expansion is stopped. According to the second exemplary embodiment, in order to stop expansion of the electronic map 12, the user releases the touch of the second finger maintained in the expansion region 14d, while maintaining the first finger maintained at the one point as illustrated in FIG. 14 (S1105). In this way, when the touch of the second finger is released, the expansion of the electronic map 12 is stopped (S1106).

At this time, when the electronic map 12 is expanded to a lesser extent than the desired magnification, the second finger from which the touch is released may touch the magnification change regions 14d and 15d again, and slides toward the expansion region 14d. At this time, the touch of the first finger still has to be maintained. Then, the stopped expansion is restarted, and the electronic map 12 is expanded again.

When the electronic map 12 is expanded to a greater extent than the desired magnification, the second finger from which the touch is released may touch the magnification change regions 14d and 15d again and slides toward the contraction region 15d. Even at this time, the touch of the first finger still has to be maintained. In this way, the expanded electronic map 12 can be reduced again at an appropriate magnification.

After touch of the second finger is released, if a predetermined time elapses while maintaining the touch of the first finger, the icon 13d is switched to the movement mode so that the icon 13d can be moved (S1107). When the first finger maintains the touch and slides in the movement mode, the icon 13d switched to the movement mode moves together in accordance with the movement of the touch of the first finger (S1108). Thereafter, the process of final setting (S1110) of the desired point may be achieved by the touch release (S1109) of the first finger, and the process of automatic contraction (S1111) of the map are the same as in the first exemplary embodiment, and therefore, the repeated explanation will not be provided.

Also, after the icon 13d is switched to the movement mode, if the touch is executed again with the second finger while the touch of the first finger is maintained, it is possible to switch to the magnification change mode again. At this time, the touch of the second finger may be a general touch, but the touch may be a long touch which requires executing the touch for a predetermined time or longer. Even if the magnification change regions 14d and 15d disappear while being switched to the movement mode, the magnification change regions 14d and 15d appear again, in response to the touch of the second finger being executed again. After switching to the magnification change mode, the expansion or contraction of the electronic map 12 may be performed by repeating the steps of S1103, S1104, S1105, and S1106.

The series of processes (S1101, S1102, S1103, S1104, S1105, S1106, S1107, S1108, S1109, S1110, and S1111) illustrated in FIGS. 11A and 11B are performed, while the touch of the first finger of the user is maintained on the display 11 of the electronic apparatus 1. By repeating the selection of desired point to set a plurality of waypoints, the processes subsequent to setting the travel route of the vehicle is the same as those in the first exemplary embodiment.

Figure 15A:
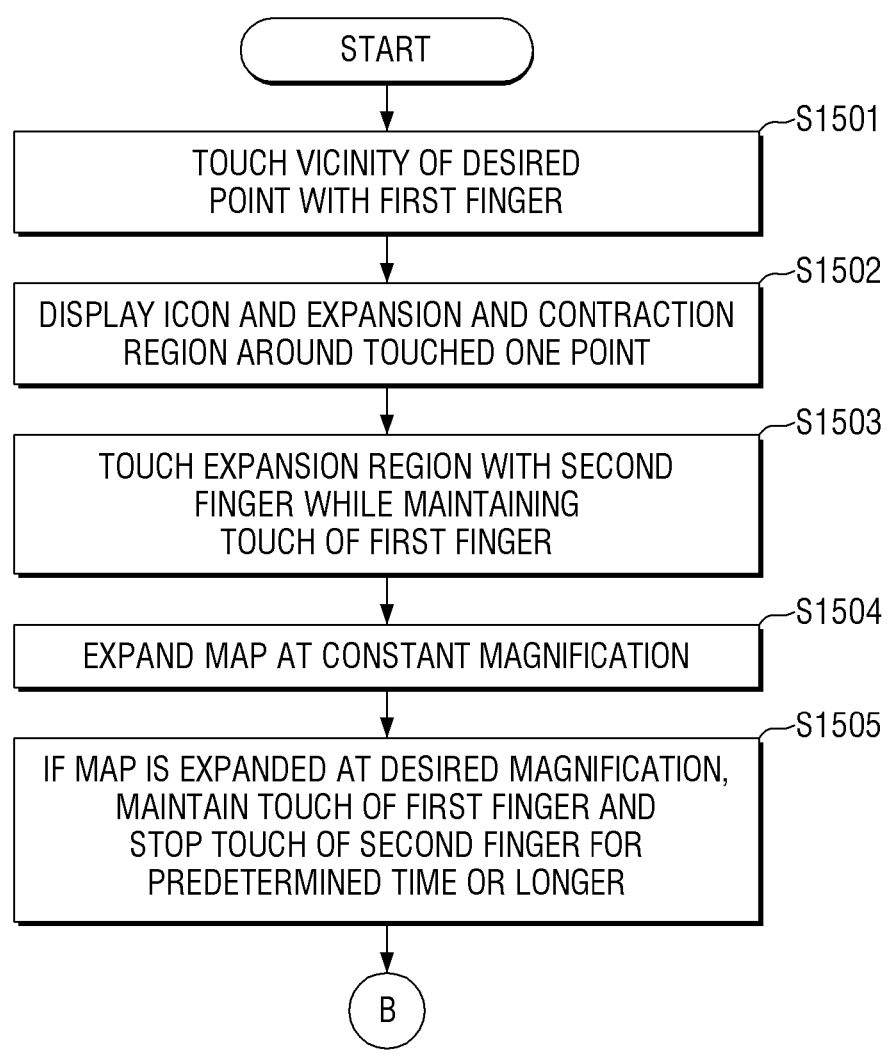
FIGS. 15A and 15B are flowcharts illustrating a method for setting a desired point according to a third exemplary embodiment.
Figure 15B:
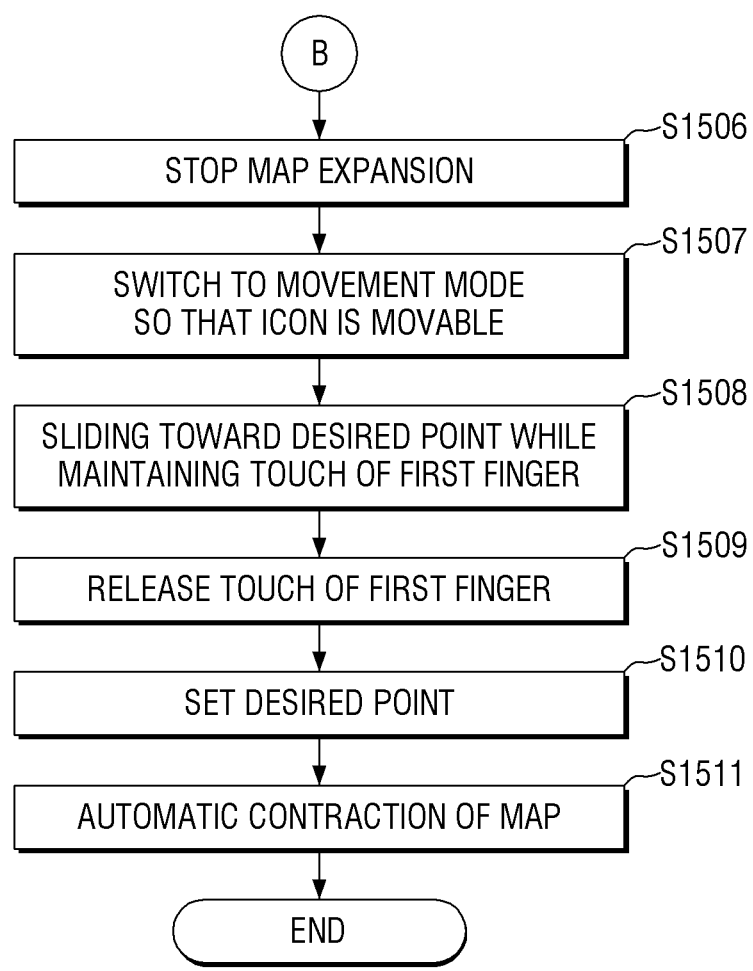
Figure 16:
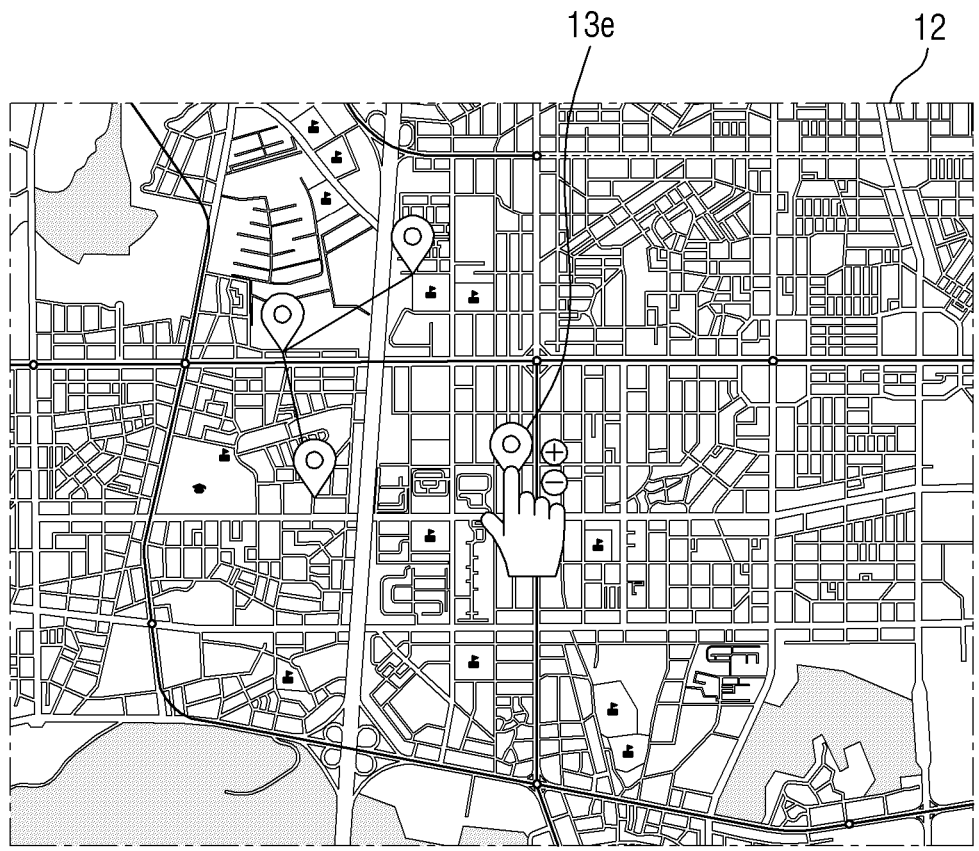
FIG. 16 illustrates an icon and magnification change regions are displayed on the electronic map according to the third exemplary embodiment.

FIGS. 15A and 15B are flowcharts illustrating a method for setting a desired point according to a third exemplary embodiment. According to this method, as illustrated in FIG. 16, a plurality of fingers is used to change the magnification of the electronic map 12. In the following description of the third exemplary embodiment, the repeated description of the same parts as those of the first exemplary embodiment described above may be omitted, and the differences will be mainly described. Hereinafter, the contents of the flowchart of FIGS. 15A and 15B will be described with reference to FIGS. 16, 17, and 18.

Figure 17:
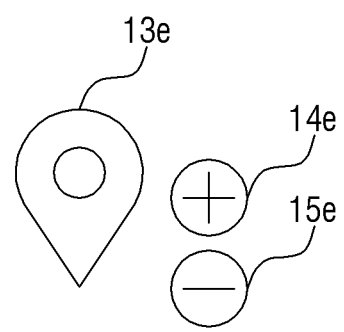
FIG. 17 is illustrates the icon displayed on the electronic map according to the third exemplary embodiment.

FIG. 16 illustrates an icon 13e and magnification change regions 14e and 15e displayed on the electronic map 12 according to the third exemplary embodiment, and FIG. 17 is illustrates a specific form of the displayed icon 13e displayed on the electronic map 12.

When the user touches the one point on the electronic map 12 with the first finger (S1501), as illustrated in FIGS. 16 and 17, the icon 13e and the magnification change regions 14e and 15e are displayed around the touched one point (S1502).

According to the third exemplary embodiment, the touch for selecting the one point and the touch of the magnification change regions 14e and 15e may be performed using the four fingers other than the thumb. Therefore, the magnification change regions 14e and 15e may be formed on the right side (left side for left-handed mode) of the icon 13e as illustrated in FIG. 17.

Referring to FIG. 17, the magnification change regions 14e and 15e according to the third exemplary embodiment may be areas displayed as two buttons formed separately on one side of the icon 13e. One of the two magnification change regions may perform the function as the expansion region 14e, and the other button may perform the function as the contraction region 15e. The expansion region 14e and the contraction region 15e may also be disposed adjacent to each other on one side of the icon 13e.

Figure 18:
FIG. 18 is illustrates a state of expanding the electronic map according to the third exemplary embodiment.

FIG. 18 is illustrates a state of expanding the electronic map 12 according to the third exemplary embodiment. In order to expand the electronic map 12 according to the third exemplary embodiment, as illustrated in FIG. 18, while fixing the first finger of the user at the touched one point, the user touches the expansion region 14e with the second finger (S1503). That is, the second finger touches the expansion region 14e, while maintaining the touch with the first finger.

When the electronic apparatus 1 maintains the touch of the first finger and senses the touch of the second finger, the electronic apparatus 1 starts expanding the electronic map 12. The electronic apparatus 1 expands the electronic map 12 by a predetermined magnification increment for each time the second finger touches the expansion region 14e (S1504). Furthermore, the electronic map 12 can be continuously expanded by maintaining the touch of the expansion region 14e with the second finger.

When the electronic map 12 is expanded at a magnification to the extent desired by the user, the expansion may be stopped. According to the third exemplary embodiment, in order to stop the expansion of the electronic map 12, the user may not provide the touch to the expansion region 14e for a predetermined time or longer, while maintaining the first finger at the one point as illustrated in FIG. 18 (S1505). If the touch of the second finger is not performed for a predetermined time or longer, the expansion of the electronic map 12 is stopped (S1506). The predetermined time may be 1 second to 3 seconds, but exemplary embodiments are not limited thereto.

Thereafter, when the expansion magnification of the electronic map 12 is not appropriate, the user touches the expansion region 14e or the contraction region 15e again, while maintaining the touch of the first finger, thereby making it possible to further adjust the appropriate magnification of the map 12.

After touch of the second finger is released, when a predetermined time elapses while maintaining the touch of the first finger, the icon 13e is switched to the movement mode so that the icon 13e can be moved (S1507). When the first finger maintains the touch and moves in the movement mode, the icon 13e switched to the movement mode moves together in accordance with the movement of the touch of the first finger (S1508). Thereafter, since the process of final setting (S1510) of the desired point achieved by the touch release (S1509) of the first finger, and the process of automatic contraction (S1511) of the map are the same as those in the first exemplary embodiment, the repeated explanation will not be provided.

On the other hand, although the touch of the first finger is maintained even after the icon is switched to the movement mode, if the touch is executed again with the second finger, the icon can be switched to the magnification change. More specifically, when the touch of the second finger is released and a predetermined time elapses, after the icon 13e is switched to the movement mode, if the second finger touches the electronic map 12 (general touch or long touch) again, the icon 13e can be switched to the magnification change mode again. At this time, while the touch of the second finger is executed again, the magnification change regions 14e and 15e can appear again. After switching to the magnification change mode, the expansion or contraction of the electronic map 12 can be performed by repeating the steps of S1503, S1504, S1505, and S1506.

The series of steps (S1501, S1502, S1503, S1504, S1505, S1506, S1507, S1508, S1509, S1510, and S1511) illustrated in FIGS. 15A and 15B are performed, while touch of the first finger of the user is maintained on the display 11 of the electronic apparatus 1. By repeating the selection of desired points to set a plurality of waypoints, the processes subsequent to setting the travel route of the vehicle is the same as those in the first exemplary embodiment.

Figure 19:
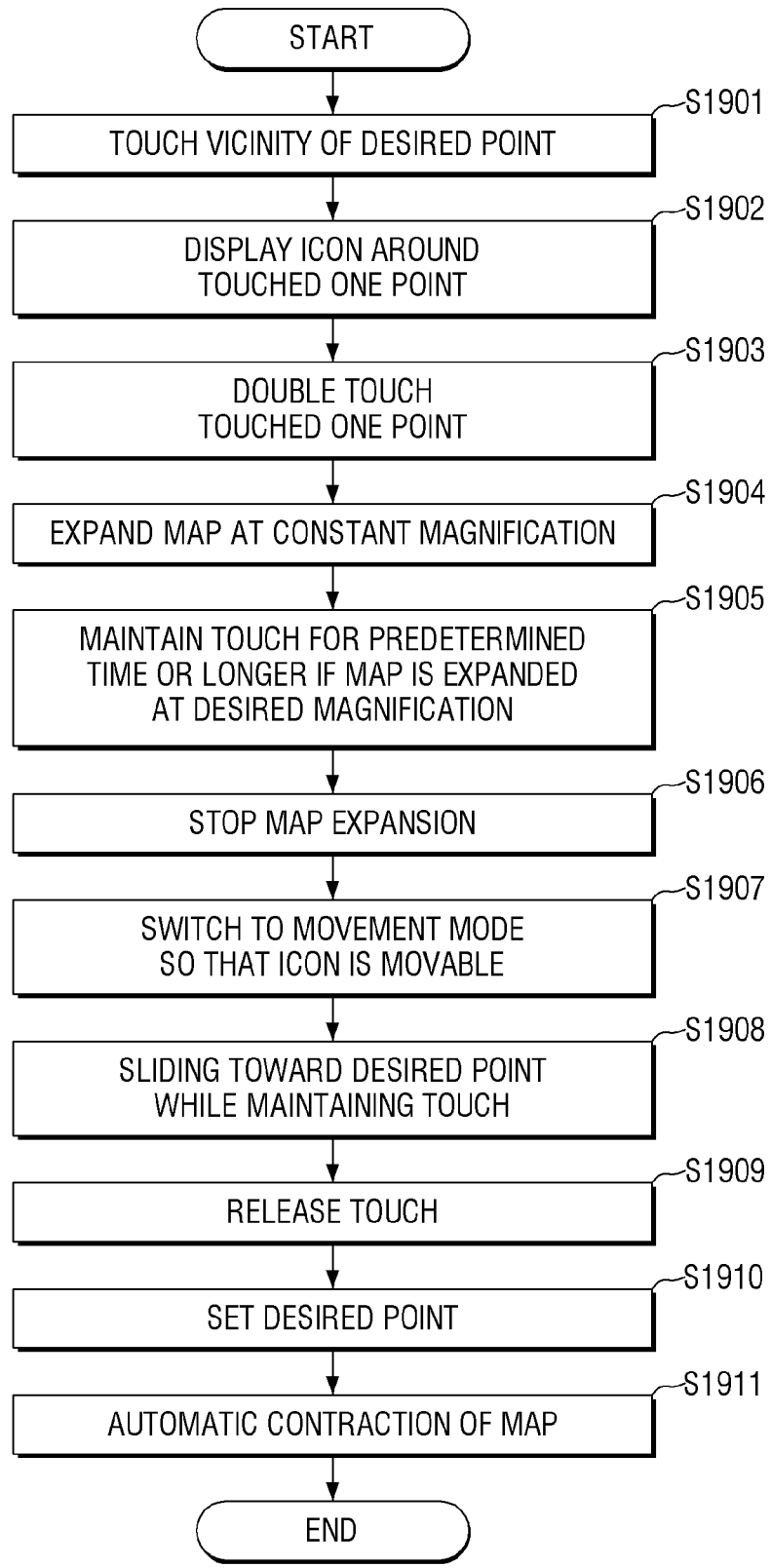
FIG. 19 is a flowchart illustrating a method for setting a desired point according to a fourth exemplary embodiment.

FIG. 19 is a flowchart illustrating a method for setting a desired point according to a fourth exemplary embodiment. According to this method, the magnification of the electronic map 12 is changed, using a double-touch. In the following description of the fourth exemplary embodiment, the repeated description of the same parts as those of the first exemplary embodiment described above will not be provided, and the differences will be mainly described. Hereinafter, the contents of the flowchart of FIG. 19 will be described with reference to FIGS. 20, 21, and 22.

Figure 20:
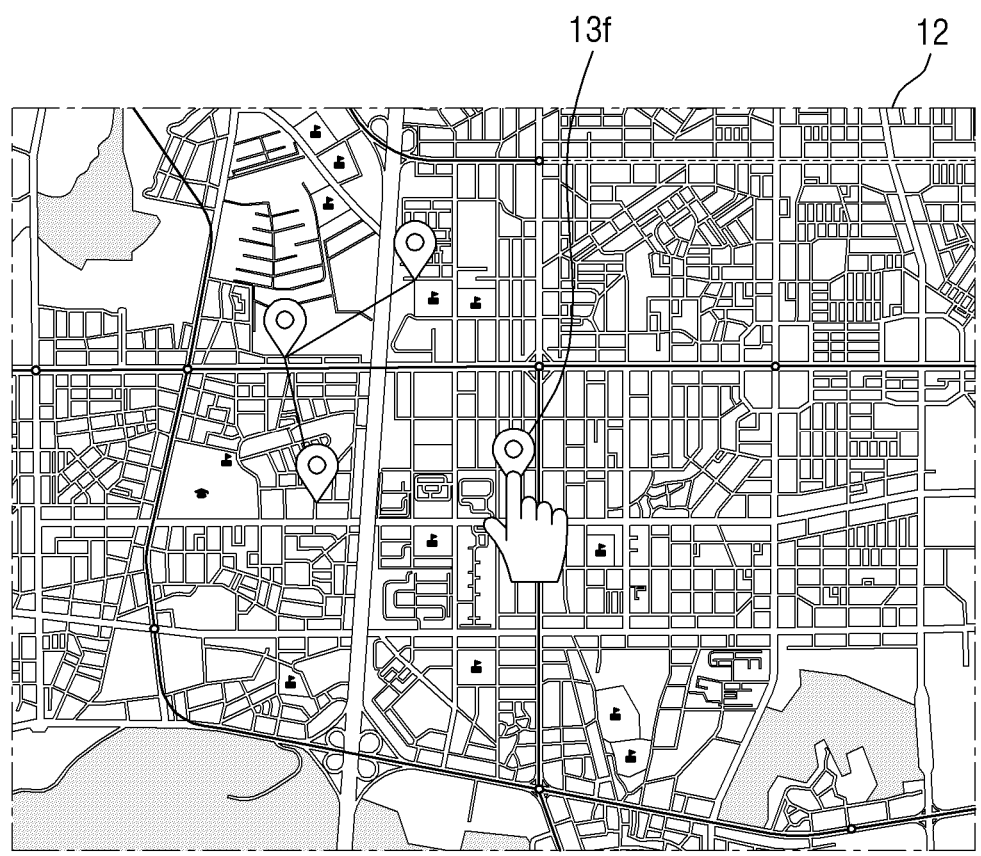
FIG. 20 illustrates an icon displayed on the electronic map according to the fourth exemplary embodiment.
Figure 21:
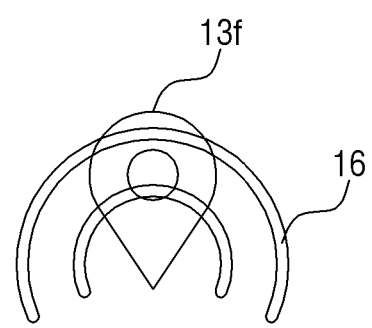
FIG. 21 illustrates the icon displayed on the electronic map according to the fourth exemplary embodiment.

FIG. 20 illustrates an icon 13f displayed on the electronic map 12 according to the fourth exemplary embodiment, and FIG. 21 is illustrates a specific example of the icon 13f displayed on the electronic map 12. When the user touches the one point on the electronic map 12 with a finger (S1901), as illustrated in FIGS. 20 and 21, the icon 13f is displayed on the touched one point (S1902).

Figure 22:
FIG. 22 illustrates a state of expanding the electronic map according to the fourth exemplary embodiment.

According to the fourth exemplary embodiment, in order to expand the electronic map 12, as illustrated in FIG. 22, the user may perform the short double-touch of one point touched by the finger (S1903). Double-touch means that a touch is input again within a predetermined time after releasing of an input touch. The aforementioned predetermined time may be about 0.01 to 0.5 seconds, but the exemplary embodiments are not limited thereto.

Further, as a modified example of the fourth exemplary embodiment, instead of performing another double-touch after the user touches a point with a finger, the double-touch may be defined as performing a subsequent touch after the touch on the one point. In such a case, when the user makes the double-touch, the point at which the first touch is performed is selected as the one point, and the electronic map 12 can be expanded on the basis of the one point. According to the modified example of the fourth exemplary embodiment, the time consumed to reach the step of expanding the electronic map 12 can be further shortened. Furthermore, according to the fourth exemplary embodiment, when the user directly performs a double-touch on the one point with the finger, the electronic map 12 may be first expanded on the basis of the one point without displaying the icon 13f. The icon 13f is displayed on the electronic map 12 in response to the user touching the one point after performing the double-touch of the user.

When sensing the double-touch, the electronic apparatus 1 starts expanding the electronic map 12. Each time the finger makes the double-touch of the above-mentioned one point once, the electronic map 12 is expanded by a predetermined magnification increment (S1904). The predetermined magnification increment may be arbitrarily changed by the user.

According to the fourth exemplary embodiment, unlike the aforementioned first, second, and third exemplary embodiments, the icon 13f may not include magnification change regions. However, an indicator 16 indicating application of the input of double-touch to the electronic apparatus 1 can be displayed each time the user makes the double-touch. Referring to FIG. 22, the exemplary embodiment illustrates that, when the user makes the double-touch on the one point with a finger, the wave pattern indicator 16 is formed around the one point, but the exemplary embodiments are not limited thereto.

When the electronic map 12 is expanded at a magnification desired by the user, the expansion may be stopped. The user stops the double-touch performed on the above-mentioned one point, and maintains the touch with the finger at the one point for a predetermined time or longer (S1905). When the touch of the finger is maintained for a predetermined time or longer, the expansion of the electronic map 12 is stopped (S1906).

In the process of expansion, if the electronic map 12 is expanded to a lesser extent than the desired magnification, another double-touch may be made on the one point with the finger. If the electronic map 12 is excessively expanded than the desired magnification, the user may used a finger to touch another point, other than the one point of performing the double-touch. Then, each time the touch is performed on the other point with the finger, the electronic map 12 is contracted by a predetermined magnification increment. According to the fourth exemplary embodiment, the user may use the second finger to touch the another point while maintaining the touch of the first finger executing the double-touch to contract the electronic map 12.

Thereafter, when the double-touch is no longer executed and the predetermined time elapses while maintaining the touch of the finger, the icon 13f is switched to the movement mode (S1907). In the movement mode, the user may maintain the touch and slide and the icon 13f moves together in accordance with the movement of the touch of the finger (S1908). Thereafter, the user may process the final setting (S1910) of the desired point by releasing the finger from the touching (S1909), and the electronic map 12 is automatic contraction (S1911) substantially the same as the first exemplary embodiment, and the repeated explanation will be omitted.

After the icon 13f is switched to the movement mode, when a predetermined time elapses in a fixed state while maintaining the touch, the icon can be switched to the magnification change mode again. More specifically, after the icon 13f is switched to the movement mode, when the touch is maintained without movement, the color of the icon 13f starts to change. The color changes for a predetermined number of times at a predetermined time interval, and when the color changes for a predetermined number of times, the icon 13f is switched to the magnification change mode again. Furthermore, the color may gradually change to a darker color from a lighter color to emphasize and indicate the user that the icon 13f will be switched to the magnification change mode from the movement mode soon. After switching to the magnification change mode in this manner, the expansion or contraction of the electronic map 12 may be performed by repeating the steps of S1903, S1904, S1905, and S1906.

As described above, the processes subsequent to setting the travel route of the vehicle by repeating the selection of the desired point to set the plurality of waypoints are the same as those in the first exemplary embodiment, and therefore, the repeated explanation will be omitted.

Figure 23:
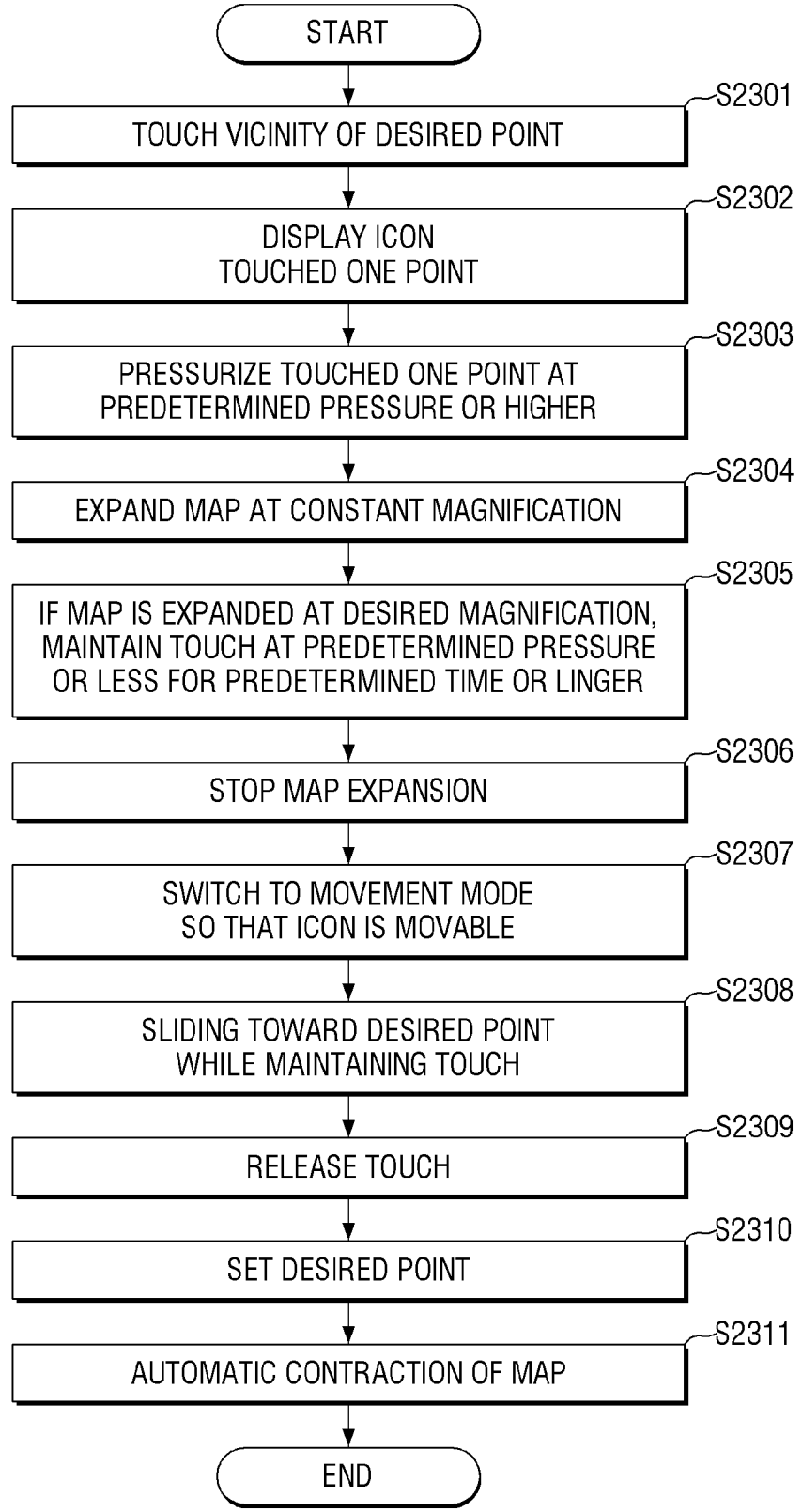
FIG. 23 is a flowchart illustrating a method for setting a desired point according to a fifth exemplary embodiment.
Figure 24:
FIG. 24 illustrates an icon displayed on the electronic map according to the fifth exemplary embodiment.

FIG. 23 is a flowchart illustrating a method for setting a desired point according to the fifth exemplary embodiment. According to this method, as illustrated in FIG. 24, in order to change the magnification of the electronic map 12, the strength of the touch pressure is used. In the following description of the fifth exemplary embodiment, the same parts as those of the first exemplary embodiment described above will not be described in detail, and the description will be focused on differences. Hereinafter, the contents of the flowchart of FIG. 23 will be described with reference to FIGS. 24, 25, 26A, 26B, and 26C.

Figure 25:
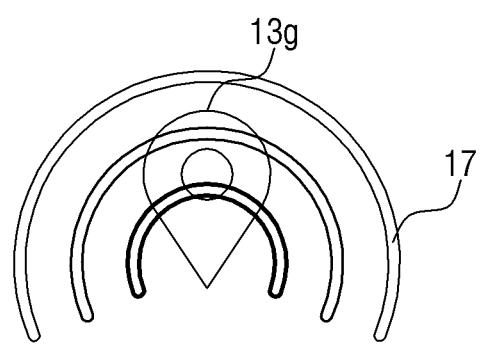
FIG. 25 illustrates the icon displayed on the electronic map according to the fifth exemplary embodiment.

FIG. 24 illustrates an icon 13g displayed on the electronic map 12 according to a fifth exemplary embodiment, and FIG. 25 is illustrates a specific form of the icon 13g displayed on the electronic map 12.

When the user touches the one point with a finger, as illustrated in FIGS. 24 and 25 (S2301), the icon 13g is displayed around the touched one point (S2302). According to the fifth exemplary embodiment, unlike the first, second, and third exemplary embodiments described above, the icon 13g may not include the magnification change regions. However, there may be an indicator 17 indicating that the input is applied to the electronic apparatus 1 each time the user applies a pressure to the touch. Referring to FIGS. 24 and 25, when a user applies the pressure to the one point with a finger, the wave pattern indicator 17 is formed around the one point. The wave pattern indicator 17 can intuitively show the pressure applied to the one point by displaying the color gradually becomes lighter from the center of the one point to the periphery.

In order to expand the electronic map 12, as illustrated in FIG. 24, the user pressurizes the one point touched by the finger (S2303). Here, pressurization may refer to an increase of the pressure applied to the electronic apparatus 1 on which the touch is performed, while maintaining the touch. Therefore, in order to sense this, the touch sensor 116 of the electronic apparatus 1 further includes means for sensing the strength (or the pressure) of the touch. That is, in order for the electronic apparatus 1 to recognize the pressurization of the touch and switch to the expansion mode, the pressure of the touch needs to exceed a predetermined reference pressure. The sensitivity of the electronic map 12 that the electronic map 12 is switched to the expansion mode can be determined according to the predetermined reference pressure.

The electronic apparatus 1 starts expanding the electronic map 12 upon sensing the pressurization of the touch exceeding the reference pressure. Every time the finger pressurizes the one point once, the electronic map 12 is expanded by a predetermined magnification increment (S2304), and the user may maintain the pressurization to continuously expand the electronic map 12. The power of magnification of the current electronic map 12 may be displayed around the icon 13g as illustrated in FIG. 24.

Conversely, in order to contract the electronic map 12, the user applies double-pressurization to the electronic apparatus 1. The double-pressurization may refer to, while maintaining the touch, reducing the pressure after the first pressure is applied, and subsequently applying a second pressure within a predetermined time. Accordingly, the electronic apparatus 1 contracts the magnification of the electronic map 12. Each time the pressurization is executed, the electronic map 12 can be expanded, and each time the double-pressurization is performed, the electronic map 12 can be contracted. According to the exemplary embodiments, the pressurizing may initially expand the electronic map 12, and the double-pressurization may change the magnification change mode to a contraction mode, such that subsequent pressurization may contract the electronic map 12.

Figure 26A:
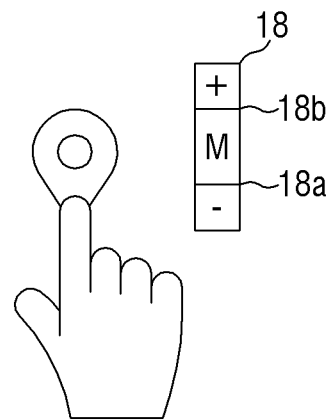
FIGS. 26A, 26B, and 26C illustrate examples of a pressure gauge according to modified examples of the fifth exemplary embodiment.
Figure 26B:
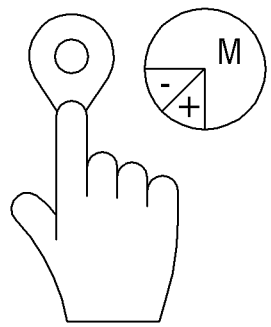
Figure 26C:
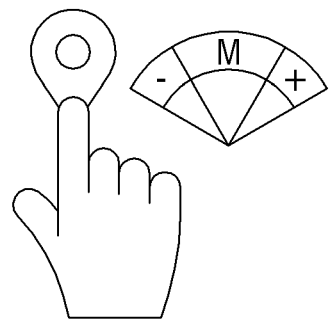

FIGS. 26A, 26B, and 26C illustrate examples in which various pressure gauges 18 are displayed in place of the wave pattern indicator 17. The user can control the expansion and contraction of the electronic map 12 and the movement of the icon 13g by adjusting the pressure of the touch applied by the finger via the electronic apparatus 1.

Specifically, when the pressure of the touch is equal to or lower than a first reference pressure 18a, the icon 13g is switched to the contraction of the electronic map 12, when the pressure of the touch is equal to or higher than the second reference pressure 18b, the icon 13g is switched to expansion of the electronic map 12, and when the pressure of the touch is between the first and second reference pressures 18a and 18b, the icon 13g is switched to the movement mode. Here, the first reference pressure 18a is lower than the second reference pressure 18b. Further, as illustrated in FIGS. 26A, 26B, and 26C, while the icon 13g is displayed, a pressure gauge 18 indicating the strength of the pressure can be displayed together in the vicinity of the icon 13g. As illustrated in FIG. 26A, the pressure gauge 18 may be a rod-shaped gauge, but it may have various shapes such as a circular gauge or a fan-shaped gauge as illustrated in FIGS. 26B and 26C. Further, the pressure gauge 18 may have different colors for each region separated on the basis of the first and second reference pressures 18a and 18b. As a result, the user may recognize the pressure level of the touch displayed on the pressure gauge 18 and may easily adjust the movement of the icon 13g and the magnification change of the electronic map 12.

When the electronic map 12 is expanded at a magnification to the extent desired by the user, the expansion may be stopped. To this end, when the user stops pressurization of the touch applied to the one point and maintains the finger's touch on the one point at the reference pressure or less for a predetermined time or longer (S2305), the expansion of the electronic map 12 may be stopped (S2306). The predetermined time may be 1 second to 3 seconds, but the exemplary embodiments are not limited thereto. According to the modified examples illustrated in FIGS. 26A, 26B, and 26C, when the pressure for applying the touch is between the first and second reference pressures, the expansion of the icon 13g is stopped and the icon 13g will be switched to the movement mode.

When the electronic map 12 is expanded to a lesser extent than the desired magnification, the user pressurizes the one point with a pressure equal to or higher than the reference pressure with the fingers. When the electronic map 12 is excessively expanded to a greater extent than the desired magnification, the double-pressurization may be applied as described above. According to the modified examples illustrated in FIGS. 26A, 26B, and 26C, the electronic map 12 may be contracted when the user pressurizes the one point equal to or less than the first reference pressure.

According to another modified example of the fifth exemplary embodiment, the user may pressurize another point with the finger that applied the pressure to the one point to expand the electronic map 12. As a result, the electronic map 12 is contracted by a predetermined magnification increment each time the other point is pressurized.

Further, according to another modified example of the fifth exemplary embodiment, the user may, while maintaining the touch and pressure of the first finger on the one point, may apply a second pressure may be applied to an other point with a second finger. Accordingly, the electronic map 12 may be contracted by a predetermined magnification increment each time the other point is pressurized with the second finger. When the electronic map 12 is adjusted at a desired magnification, while maintaining the first finger on the one point, the user may release the touch of the second finger touching the other point. Accordingly, the contraction of the electronic map 12 may be stopped, and the electronic map 12 may be changed at a magnification to the extent desired by the user.

When the pressurized touch is no longer executed and the predetermined time elapses while maintaining the touch of the finger at a pressure equal to or less than the reference pressure, the icon 13g is switched to the movement mode (S2307). When the finger maintains the touch and slides, the icon 13g in the movement mode moves in accordance with the movement of the touch of the finger (S2308). Thereafter, the user may perform the final setting (S2310) of the desired point by releasing the touch (S2309) of the finger and the map may be automatic contracted (S2311), as substantially the same as those in the first exemplary embodiment, and the repeated explanation will be omitted.

On the other hand, after the icon 13g is switched to the movement mode, a predetermined time may elapse in a fixed state while maintaining the touch, and the icon can be switched to the magnification change mode again. Specifically, after the icon 13g is switched to the movement mode, when the touch is maintained without movement, the color of the icon 13g starts to change. The color changes several times at predetermined time intervals, and thereafter, the icon 13g is switched to the magnification change mode. Furthermore, the color may gradually change to a darker color from a lighter color to emphasize and indicate the user that the icon 13g will be switched to the magnification change mode from the movement mode soon. The method for expanding or contracting the electronic map 12 after changing to the magnification change mode in this manner is substantially the same as described above.

The series of processes (S2301, S2302, S2303, S2304, S2305, S2306, S2307, S2308, S2309, S2310, and S2311) illustrated in FIG. 23 is performed, while maintaining the touch of the user's finger on the display 11 of the electronic apparatus 1. By repeating the selection of the desired point to set a plurality of waypoints, the processes subsequent to setting the travel route of the vehicle are the same as those of the first exemplary embodiment.

Figure 27:
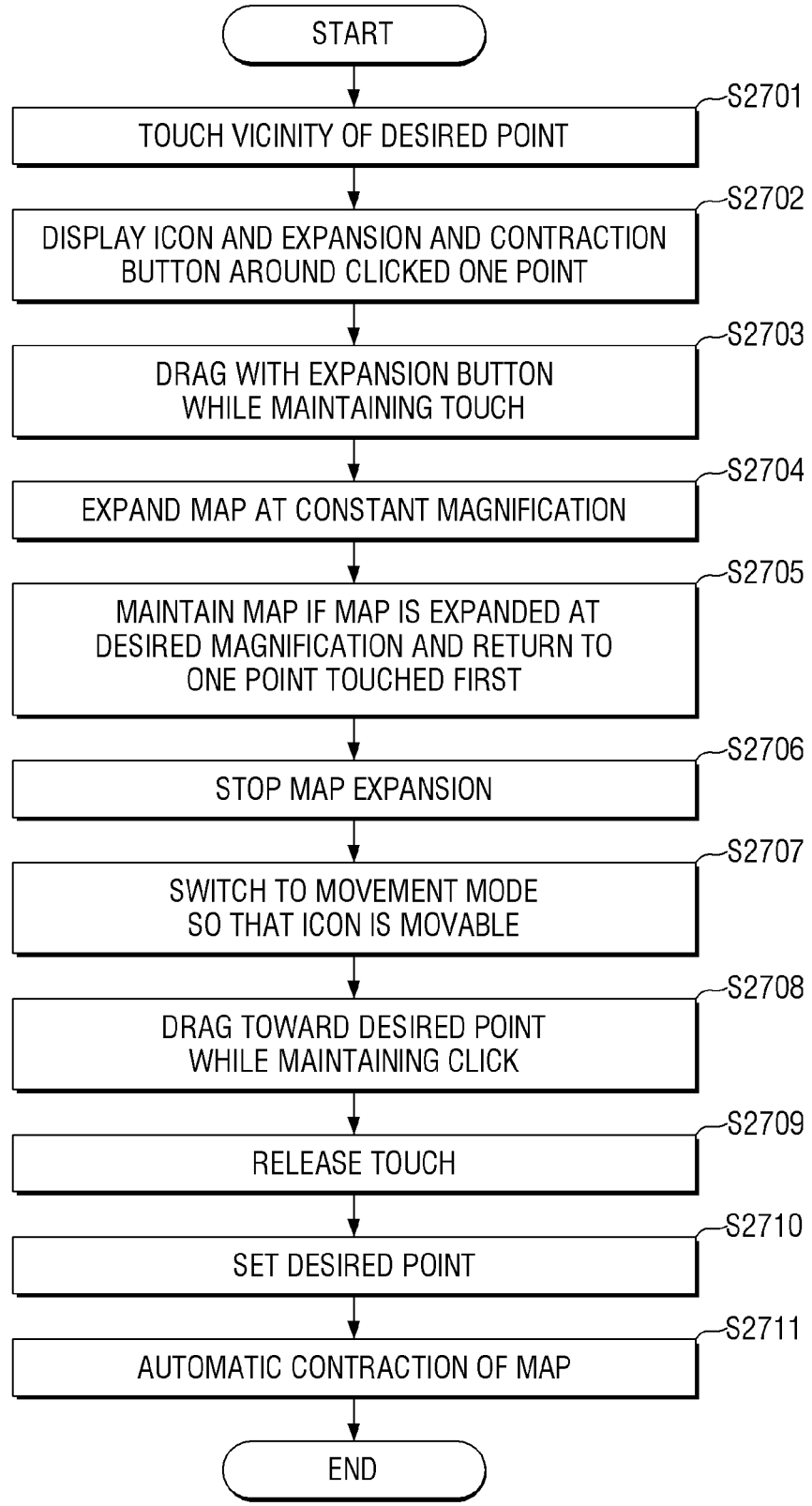
FIG. 27 is a flowchart illustrating a method for setting a desired point according to a sixth exemplary embodiment.
Figure 28:
FIG. 28 illustrates an icon and magnification change regions are displayed on the electronic map according to the sixth exemplary embodiment.

FIG. 27 is a flowchart illustrating a method for setting a desired point according to a sixth exemplary embodiment. According to this method, as illustrated in FIG. 28, it is possible to understand that a desired point on the electronic map is set using a click rather than a touch. In the following description of the sixth exemplary embodiment, the repeated explanation of the same parts as those of the first exemplary embodiment described above will not be provided, and the differences will be mainly described.

Unlike the electronic apparatus 1 of the first to fifth exemplary embodiments, the electronic apparatus according to the sixth exemplary embodiment is an apparatus that does not provide a touch function, such as a desktop, a general notebook PC or the like, and receives commands using a input device, such as a mouse and a touch pad. Therefore, the display according to the sixth exemplary embodiment does not require a touch panel that provides a touch sensing function. The laptop may include a touch pad to provide a touch sensing function independent of the touch screen, and the touch pad is actually for the mouse pointer movement and is related to the sixth exemplary embodiment. Hereinafter, the contents of the flowchart of FIG. 27 will be described with reference to FIGS. 28, 29, 30, and 31.

According to the sixth exemplary embodiment, as illustrated in FIG. 28, the user clicks the vicinity of a desired point on the electronic map, using a mouse pointer (S2701). When the user clicks the one point with a mouse, as illustrated in FIG. 28, the icon 13a and the magnification change regions 14a and 15a are displayed around the clicked one point (S2702). The icon 13a and the magnification change regions 14a and 15a according to the sixth exemplary embodiment will be described by taking the shape as illustrated in FIG. 5A as an example. Of course, the magnification change region may have a shape as illustrated in FIG. 5B or 5C.

Figure 29:
FIG. 29 illustrates a state of expanding the electronic map according to the sixth exemplary embodiment.

FIG. 29 is illustrates a state of expanding the electronic map according to the sixth exemplary embodiment. In order to expand the electronic map according to the sixth exemplary embodiment, as illustrated in FIG. 29, the user moves the mouse clicked toward the expansion region 14a by dragging, while maintaining the click with the mouse (S2703). When sensing the dragging of the mouse, the electronic apparatus starts expanding the electronic map. After the mouse is dragged, during the time when the mouse maintains the click in the expansion region 14a, each time the predetermined time interval elapses at a predetermined time interval, the electronic map is expanded by a predetermined magnification increment (S2704). At this time, the electronic map is expanded on the basis of one point selected by the user.

Figure 30:
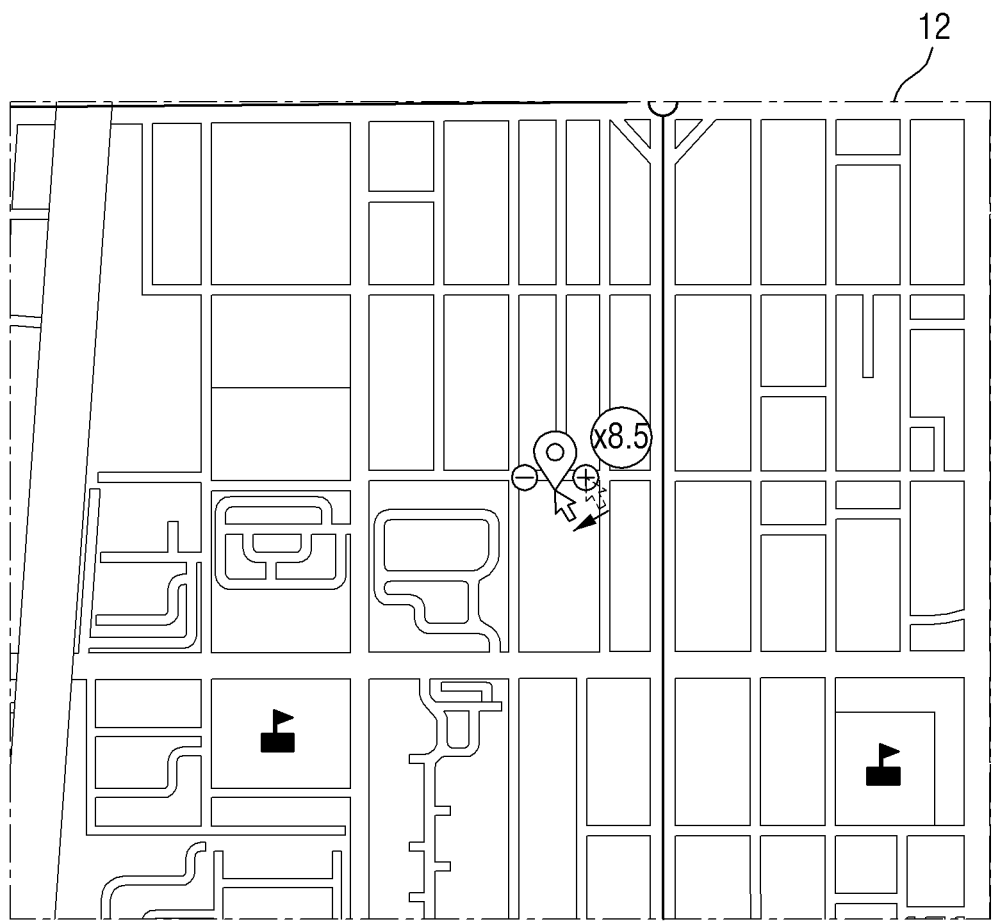
FIG. 30 illustrates a state of stopping the expansion of the electronic map according to the sixth exemplary embodiment.

When the electronic map is expanded at the magnification to the extent desired by the user, the expansion may be stopped. According to the sixth exemplary embodiment, in order to stop the expansion of the electronic map, the user may drag the mouse back to the above-mentioned one point while maintaining the click from the expansion region 14a as illustrated in FIG. 30 (S2705). In this way, when the mouse pointer is dragged to the one point, the expansion of the electronic map is stopped (S2706).

Whether or not the mouse click is dragged and returned to the one point may be determined on the basis of whether the mouse pointer enters the virtual return region as in the first exemplary embodiment. In this way, when a predetermined time elapses after the mouse pointer enters the return region, the icon 13a may be switched to the movement mode.

At this time, if the electronic map is expanded to the lesser extent than the desired magnification, the mouse returned to the one point may be moved or dragged toward the expansion region 14a again. Then, the stopped expansion may be resumed and the electronic map may be expanded or magnified again.

when the electronic map is expanded to a greater extent than the desired magnification, the mouse maintaining the click in the expansion region 14a may be moved or dragged toward the contraction region 15a. During the time when the mouse maintains the click in the contraction region 15a, each time a predetermined time interval elapses, the electronic map is contracted by a predetermined magnification increment. When the electronic map is adjusted at the necessary magnification through such a process, the contraction of the electronic map is stopped, by moving or dragging the mouse from the contraction region 15a back to the above-mentioned one point while maintaining the click.

When a predetermined time elapses after the mouse pointer enters the returning region, the icon 13a is switched to the movement mode (S2707). When dragging the icon 13a switched to the movement mode while maintaining the mouse click, the icon 13a also moves together (S2708). Since the process of final setting (S2710) of the desired point achieved by releasing (S2709) of mouse click and the process of the map automatic contraction (S2711) are the same as those in the first exemplary embodiment, the repeated explanation will not be provided.

Figure 31:
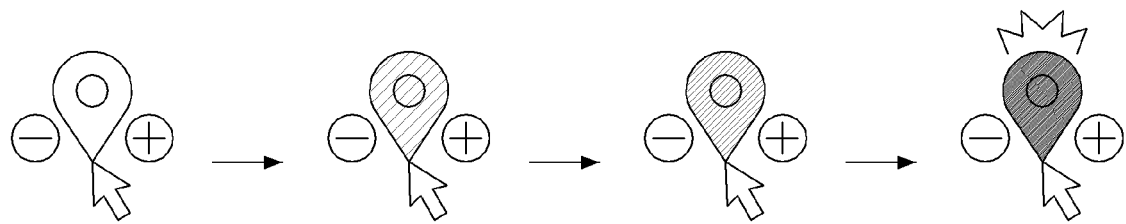
FIG. 31 illustrates a process in which the icon according to the sixth exemplary embodiment is switched from the movement mode into the magnification change mode again.

On the other hand, even after the icon 13a is switched to the movement mode, although clicking of the mouse is maintained, if a predetermined time elapses in a stopped state without movement, the icon may be switched to the magnification change mode again. Specifically, as illustrated in FIG. 31, after the icon 13a is switched to the movement mode, the click is maintained, but when the icon 13a is stopped without movement, the color of the icon 13a starts to change. The color changes several times at a predetermined time interval, and when the constant number of times changes, the icon 13a is switched to the magnification change mode again. Furthermore, the color may gradually change to a dark color from a light color to emphasize and report the user the fact that the icon 13a will be switched to the magnification change mode from the movement mode soon. Further, the predetermined time interval may be an interval of 0.25 seconds to 0.5 second, and the number of changes of the color may be 3 to 6 times, but the exemplary embodiments are not limited thereto. After switching to the magnification change mode, the expansion or contraction of the electronic map may be performed by repeating the steps of S2703 to S2707.

The series of processes (S2701, S2702, S2703, S2704, S2705, S2706, S2707, S2708, S2709, S2710 and S2711) illustrated in FIG. 27 are performed while maintaining the mouse click. The subsequent processes for setting the travel route of the vehicle by repeating the selection of the desired point to set a plurality of waypoints are the same as those in the first exemplary embodiment.

Figure 32:
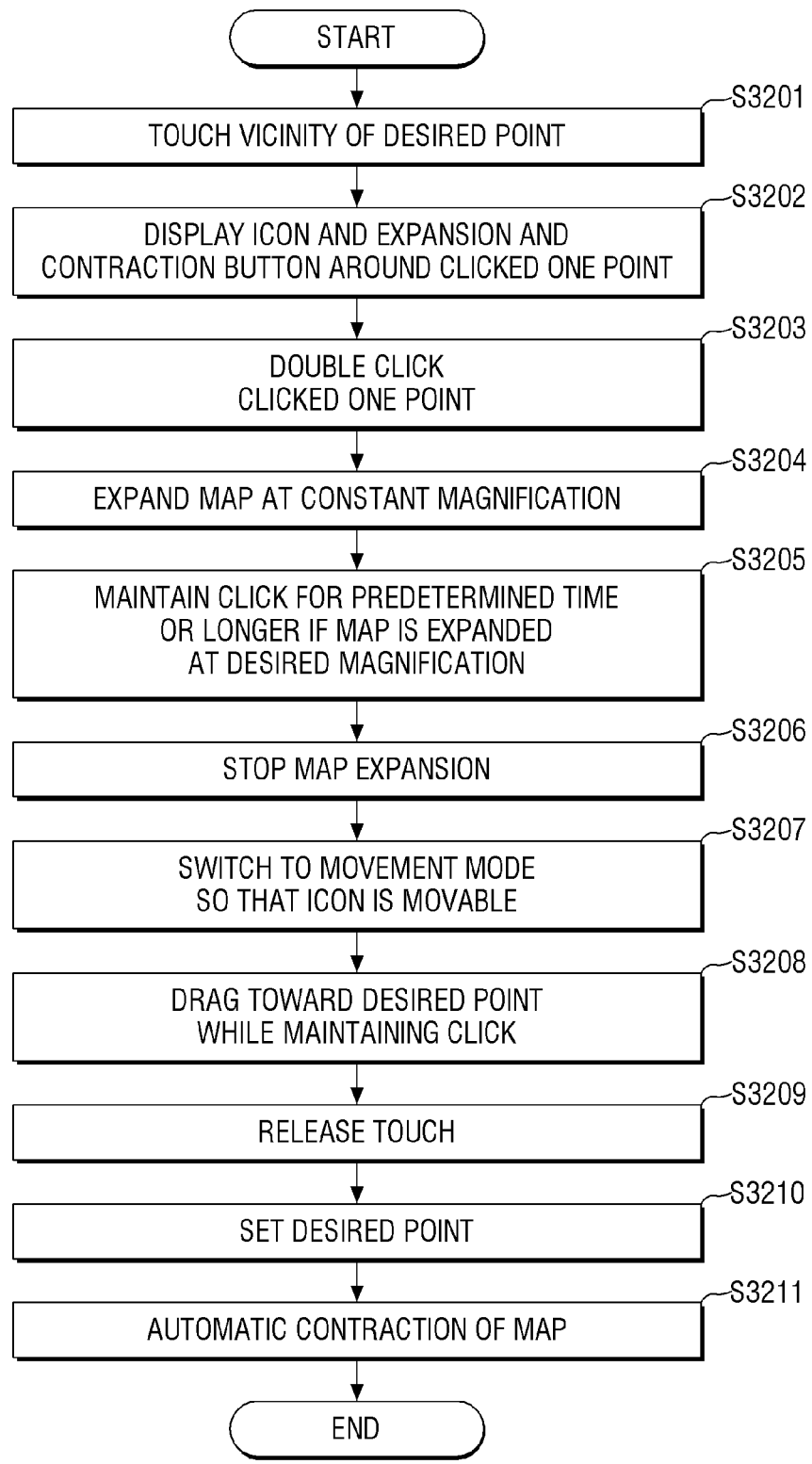
FIG. 32 is a flowchart illustrating a method for setting a desired point according to a seventh exemplary embodiment.

FIG. 32 is a flowchart illustrating a method for setting a desired point according to a seventh exemplary embodiment. According to this method, the magnification of the electronic map is changed using a double-click. In the following description of the seventh exemplary embodiment, the repeated explanation of the same parts as those of the above-described fourth exemplary embodiment will be omitted, and differences will be mainly described. Hereinafter, the contents of the flowchart of FIG. 32 will be described with reference to FIG. 33.

Figure 33:
FIG. 33 illustrates a state of expanding an electronic map according to a seventh exemplary embodiment.

FIG. 33 illustrates an icon 13f displayed on the electronic map according to the seventh exemplary embodiment. The shapes of the icon 13f and the indicators 16 are the same as those of FIG. 21, and only the mouse points are additionally displayed here. When the user clicks the one point with a mouse (S3201), as illustrated in FIG. 33, the icon 13f is displayed around the clicked one point (S3202).

According to the seventh exemplary embodiment, in order to expand the electronic map, as illustrated in FIG. 33, the user may performs the double-click of the one point clicked with the mouse (S3203). The double-click means that a click is input again within a predetermined time after releasing the input click. The predetermined time may be about 0.01 to 0.5 seconds, but the exemplary embodiments are not limited thereto.

When the electronic apparatus senses the double-click, it starts to expand the electronic map. Each time the mouse double-clicks on the one point once, the electronic map is expanded by a predetermined magnification increment (S3204). The predetermined magnification increment may be arbitrarily changed by the user.

According to the seventh exemplary embodiment, unlike the sixth exemplary embodiment, it is not necessary for the magnification change region to exist. However, each time the user performs the double-click, an indicator 16 indicating that the double-click input is applied to the electronic apparatus may be displayed.

When the electronic map is expanded at the magnification desired by the user, the expansion may be stopped. According to the exemplary embodiment, the user may stop the double-click executed on one point, move the mouse pointer to the one point, and maintain the click for a predetermined time or longer in the one point (S3205). When the mouse click is maintained for a predetermined time or longer, the expansion of the electronic map is stopped (S3206).

When the electronic map is expanded to a lesser extent than the desired magnification, the user may perform double-click on the one point again with the mouse. When the electronic map is expanded excessively than the desired magnification, the user click the other point instead of the point that the above double-click was executed. As a result, each time the other point is clicked, the electronic map is reduced by a predetermined magnification increment.

When the double-click is no longer executed and the predetermined time elapses while maintaining the click of the mouse, the icon 13f is switched to the movement mode (S3207). When the user drags the mouse pointer while maintaining the click of the mouse, the icon 13f in the movement mode moves together accordingly (S3208). Thereafter, the process of final setting (S3210) of the desired point may be achieved by releasing (S3209) the mouse click and the process of the map automatic contraction (S3211), which are substantially the same as those in the fourth exemplary embodiment, and the repeated explanation will be omitted.

After the icon 13f is switched to the movement mode, when the click is maintained for the predetermined time without movement, the icon may be switched to the magnification change mode again. Specifically, as illustrated in FIG. 9, after the icon 13f is switched to the movement mode, when the click is maintained without movement, the color of the icon 13f starts to change. The color changes several times at a predetermined time interval, and when the color changes for the predetermined number of times, the icon 13f is switched to the magnification change mode again. After switching to the magnification change mode in this manner, the expansion or contraction of the electronic map may be performed by repeating the above-described steps of S3203, S3204, S3205, and S3206.

As described above, since the processes subsequent to setting the travel route of the vehicle by repeating the selection of the desired point to set the plurality of waypoints is the same as those in the fourth exemplary embodiment, the repeated explanation will be omitted.

According to the eighth exemplary embodiment of the exemplary embodiment, a method for setting a desired point and a method for setting a travel route of a moving bod performs the touch of finger, the touch of stylus pen or the mouse click on the electronic map, using an electronic apparatus. The method for setting the desired point and the method for setting the travel route of the vehicle according to the eighth exemplary embodiment may be performed, by releasing touching or clicking of the user's finger, the stylus pen, or the mouse on the display of the electronic apparatus on the way.

A state of applying a touch input on an electronic map 12 to execute a method for setting a desired point and a method for setting a travel route of a vehicle according to the eighth exemplary embodiment is described with reference to FIG. 3.

The method for setting the desired point and the method for setting the travel route of the vehicle according to the eighth exemplary embodiment are the same as those of the first to seventh exemplary embodiments in most procedures, except the characteristics in which the touch is not continuously maintained in the process of changing the magnification of the electronic map 12 after icon 13 is displayed on the electronic map 12. Hereinafter, although the eighth exemplary embodiment will be explained to correspond to the first exemplary embodiment for the sake of convenience, the eighth exemplary embodiment may also correspond to the second to seventh exemplary embodiments without being limited thereto.

In order to set the desired point according to the eighth exemplary embodiment, as illustrated in FIG. 3, the user touches the vicinity of the desired point on the electronic map 12. Here, the touch may be a touch using a finger, but the exemplary embodiments are not limited thereto, and various methods can be used. Hereinafter, it is assumed that a finger is used in the above-mentioned touch.

FIG. 4 illustrates the icon 13a and the magnification change regions 14a and 15a displayed on the electronic map 12 according to the eighth exemplary embodiment, and FIGS. 5A, 5B, and 5C are diagrams illustrating the aspect of the icon 13 displayed on the electronic map 12 according to the eighth exemplary embodiment and the modified example.

When the user touches the one point, as illustrated in FIG. 4, the icon 13a and the magnification change regions 14a and 15a are displayed around the touched one point. As a modified example of the eighth exemplary embodiment, a long touch input may be used for the one point on the electronic map by a method for sensing a touch command for selecting the user's one point.

As illustrated in FIGS. 5A and 5B, the magnification change regions 14a 15a, 14b, and 15b according to the eighth exemplary embodiment may be displayed by the expansion or contraction buttons formed separately on the left and right sides of the icons 13a and 13b. Alternatively, as illustrated in FIG. 5C, the magnification change regions 14c and 15c according to the eighth exemplary embodiment are displayed by one region below the icon 13c, and the expansion region 14c and the contraction region 15c may have the one region by dividing into partial regions, respectively.

Figure 34:
FIG. 34 illustrates a state in which the touch is released after an icon according to an eighth exemplary embodiment of the exemplary embodiment is displayed.

FIG. 34 illustrates a state in which the touch is released after the icon 13a according to the eighth exemplary embodiment is displayed. According to the eighth exemplary embodiment, as illustrated in FIG. 34, even when the touch of the finger touching the one point after displaying the icon is released, the point is not immediately designated as the desired point, and the magnification change mode is maintained. Therefore, when touching the magnification change regions 14a and 15a with the finger after releasing the touch, the magnification of the electronic map 12 is changed.

Figure 35:
FIG. 35 illustrates a state of expanding the electronic map according to the eighth exemplary embodiment.

FIG. 35 illustrates a state of expanding the electronic map 12 according to the eighth exemplary embodiment. As illustrated in FIG. 35, the user may touch the expansion region 14a with the finger after releasing the touch. When sensing the touch of the finger, the electronic apparatus 1 starts expanding the electronic map 12. After the finger is touched, every time the predetermined time interval elapses at a predetermined time interval during the time while maintaining the finger touching the expansion region 14a, the electronic map 12 is expanded by a predetermined magnification increment.

As a modified example of the eighth exemplary embodiment, it is possible to perform expansion/reduction operation, by repeating the touch and the touch release such as pressing of the button, rather than maintaining the touch in the expansion region 14a with the finger. The electronic map 12 is expanded by a predetermined magnification increment every time the operation of touching and releasing the touch in the expansion region 14a is repeated for one cycle.

When the electronic map 12 is expanded at a magnification desired by the user, in order to stop the expansion of the electronic map 12, the one point is touched, without touching the expansion region 14 with the finger any more. When the finger touches the one point, the icon 13a is switched to the movement mode.

Thereafter, when the touched finger of the user slides toward the desired point while maintaining the touch with the finger, the icon 13a moves to the desired point together in accordance with the movement. At this time, when protruded one side of the icon 13a accurately indicates the desired point, by releasing the touch, the desired point desired by the user can be finally set.

On the other hand, even after the icon 13a is switched to the movement mode, the touch is maintained, but when the predetermined time elapses in the stopped state without movement, the icon may be switched to the magnification change mode again. The processes subsequent to setting the travel route of the vehicle by repeating the selection of the desired point to setting the plurality of waypoints in this way are the same as those in the first exemplary embodiment.

A method for setting a travel route of a vehicle according to a ninth exemplary embodiment of the exemplary embodiment will be described. According to this method, the user allows a plurality of fingers to touch on the electronic map 12 using the electronic apparatus 1. However, unlike the second and third exemplary embodiments, the magnification change region does not exist separately here.

When the user touches the vicinity of a desired point on the electronic map 12, as illustrated in FIG. 20, the icon 13f is displayed around the touched one point. At this time, according to the ninth exemplary embodiment, as in the fourth and fifth exemplary embodiments, the magnification change region is not displayed and only the icon 13f is displayed.

Figure 36:
FIG. 36 illustrates a state of expanding the electronic map according to a ninth exemplary embodiment.

FIG. 36 is illustrates a state of expanding the electronic map 12 according to the ninth exemplary embodiment. As illustrated in FIG. 36, the user can expand the electronic map, by performing an operation of opening the two fingers widening the interval, while maintaining touching on the electronic map 12 with both the two fingers. Specifically, when the distance between the touched points of two fingers gradually increases, the map is expanded. Meanwhile, when the distance between the two fingers gradually decreases, the map is contracted. While the magnification changes, the touch of both the two fingers needs to be maintained. As the change in the distance between the two points is rapid, the increment of the changed magnification of the electronic map 12 is large. As the change in the distance between the two points is slow, the increment of the magnification of the electronic map 12 is small.

At this time, the touch of two fingers can be performed, by newly touching with another finger while maintaining the touch of the touched finger for selecting the above-mentioned one point. However, the exemplary embodiments are not limited thereto. Touch of the two fingers may be performed, through various methods such as new touch of arbitrary two fingers after release of the touch of the finger touched for selection of the above-mentioned one point. If the touch of all the two fingers is maintained, by moving all the two fingers, or by moving the other finger while stopping one finger, the electronic map 12 can be expanded or contracted until the desired magnification is obtained.

Thereafter, as illustrated in FIG. 36, when one of the two fingers maintained touching on the electronic map 12 is released, the icon is switched to the movement mode from the magnification change mode. Further, by causing the remaining one finger on which the touch is maintained to slide on the map, the icon 13f indicating the one point can be moved on the electronic map 12. That is, the switch is performed such that, when touch of two fingers is maintained at the same time, recognition is made as the magnification change mode, and when touch of only one finger is maintained, recognition is made as the movement mode. Of course, when the user executes the sliding with the finger, the electronic map 12 can be made to move, while the icon 13f is stopped instead of moving the icon 13f.

On the other hand, if the user tries to further change the magnification of the map, after the icon 13f is switched to the movement mode and the icon is moved on the map, the user may maintain the touch of the two fingers at the same time again, the icon can be quickly switched to the magnification change mode.

After the icon 13f is finally moved to the desired position on the map in the movement mode, when the touch of the remaining one finger maintaining the touch is released, the point to which the icon 13f is moved is set as a final point. Also, as mentioned above, it is a matter of course that the point may be set as the final point and the electronic map may be automatically contracted at a predetermined rate.

According to the ninth exemplary embodiments, it is necessary to repeat the pinch-to-zoom action on the display 11 several times in order to expand or contract the electronic map 12. However, even if such a pinch-to-zoom action is performed, at least one touch is maintained in order to move the icon. Further, when the touch of one of the two fingers is released, since the icon immediately switches to the movement mode, the icon can be quickly moved, using the remaining finger that maintains the touch. That is, the switching process between the magnification change mode of the electronic map and the movement mode of the icon can be executed very quickly and easily.

Some of the advantages that may be achieved by exemplary embodiments of the invention and/or exemplary methods of the invention include reducing the time required to set the waypoints by minimizing the repeated work and capable of accurately setting the waypoints.

It is possible to accurately select expansion and contraction of the map and the arbitrary point by reducing the number of times of repeating the touch of one finger or the click of the mouse in order to select arbitrary point on the map. Accordingly, it is possible to provide the convenience of the map expansion and contraction action to the user, to enable selection of the accurate point, and to reduce the required time.

Further, since it is possible to generate a travel route of the vehicle, by setting the waypoint using the method for selecting arbitrary point, it is possible to reduce the time required for setting the waypoint and to accurately set the waypoint, by suppressing the repetitive work to the minimum.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method for setting a target point on an electronic map, the method performed by an electronic apparatus equipped with a display on which the electronic map is displayed and commands are input through touch, the method comprising:
sensing a selection of one point on the electronic map;
displaying a selection icon on the electronic map;
receiving, in a magnification change region, an input of a magnification change command of the electronic map through a first touch;
adjusting the electronic map by expanding or contracting the electronic map with respect to the one point in accordance with the magnification change command and displaying the electronic map on the display; and
stopping the expansion and contraction of the electronic map and switching the selection icon to a movement mode in which the selection icon is movable on the electronic map, in response to a sliding touch input moving toward the selection icon away from the magnification change region,
wherein at least the first touch is continuously maintained during the sensing of the selection of the one point and the receiving of the input of the magnification change command.

2. The method of claim 1, further comprising:
sensing a movement of a position of the selection icon displayed on the adjusted electronic map; and
setting the target point on a basis of the movement of the selection icon.

3. The method of claim 2, wherein the touch is continuously maintained during the sensing of the selection of the one point, the receiving of the input of the magnification change command, and the sensing of the movement of the selection icon.

4. The method of claim 1, wherein the receiving of the input of the magnification change command comprises:
displaying a magnification change region on the electronic map adjacent to the one point when sensing the selection of the one point; and
receiving the magnification change command through the magnification change region.

5. The method of claim 4, wherein the receiving of the input of the magnification change command comprises:
receiving a sliding touch input in which the first touch is moved continuously to the magnification change region while maintaining the touch, and
wherein the adjusting of the electronic map comprises:
expanding the electronic map in response to sensing that the sliding touch input selects an expansion region of the magnification change region; and
contracting the electronic map in response to sensing that the sliding touch input selects a contraction region of the magnification change region.

6. The method of claim 3, wherein the setting of the target point comprises, in response to releasing the touch input, setting a point at which the selection icon is finally located on the electronic map as the target point.

7. The method of claim 1, wherein the sensing the selection of one point comprises, in response to a plurality of touches executed together on the display, a plurality of commands being input together to the electronic apparatus.

8. The method of claim 7, wherein the sensing the selection of one point comprises: in response to sensing the first touch input on the display, selecting the detected point as the one point, and
adjusting the electronic map comprises: in response to sensing a second touch input, changing a magnification on the electronic map.

9. The method of claim 8, wherein the receiving of the input of the magnification change command comprises:
displaying a magnification change region adjacent to the selected one point on the electronic map in response to sensing of the selection of the one point, and
wherein the adjusting of the electronic map comprises:
expanding the electronic map in response to sensing the second touch input in an expansion region of the magnification change region; and contracting the electronic map in response to sensing the second touch input in a contraction region of the magnification change region.

10. The method of claim 8, wherein the adjusting of the electronic map comprises, in response to the second touch input not being applied for a predetermined time or more, switching the selection icon displayed on the adjusted electronic map to a movement mode, the selection icon being movable on the electronic map.

11. The method of claim 1, wherein the receiving of the input of the magnification change command comprises:
expanding and contracting the electronic map in response to the selected one point touched on the display is pressurized with a pressure equal to or lower than a first reference pressure or equal to or higher than a second reference pressure.

12. The method of claim 11, wherein the receiving of the input of the magnification change command comprises: in response to the touch being maintained at a pressure between the first and second reference pressure for a time longer than a certain reference time, switching the selection icon displayed on the adjusted electronic map to a movement mode, the selection icon being movable on the electronic map in the movement mode.

13. The method of claim 2, the setting of the target point comprises automatically expanding or contracting the electronic map back to a magnification of the electronic apparatus before setting the target point is performed.

14. A method for setting a target point on an electronic map, the method performed by an electronic apparatus equipped with a display on which the electronic map is displayed and a command is input via a touch, the method comprising:
sensing a selection and a movement of one point on the electronic map;
displaying a first region for receiving a command for moving the one point and for sensing a return from a magnification change command input, and a second region for receiving a command for changing a magnification of the electronic map, the first region and the second region displayed adjacent to each other on the display, on a basis of the position of the detected one point;
changing the magnification of the electronic map on the basis of the position of the one point in accordance with the input of the command sensed in the second region, and displaying the electronic map on the display at the changed magnification; and
stopping a magnification change and switching a selection icon to a movement mode in which the selection icon is movable on the electronic map when a command input to the second region returns to the first region and is sensed in the first region.

15. The method of claim 14, further comprising:
setting the target point on a basis of a final position at which the selection icon is moved on the display.

16. The method of claim 15, wherein at least one touch is continuously maintained during the sensing of the selecting of the one point in response to the movement of the selection icon on the display.

17. The method of claim 14, wherein the first region is displayed at a position corresponding to the selected one point, and
the second region is displayed at a position adjacent to the first region.

18. A method for setting a target point on an electronic map, the method performed by an electronic apparatus equipped with a display on which the electronic map is displayed and a command is input through the touch, the method comprising:
receiving a touch input of the electronic map indicating a touched region;
adjusting the electronic map by expanding or contracting the electronic map with respect to the touched region in accordance with receiving, in a magnification change region, a magnification change command and displaying the electronic map on the display;
stopping the expansion and contraction of the electronic map and switching a selection icon to a movement mode in which the selection icon is movable on the electronic map, in response to a sliding touch input moving toward the selection icon away from the magnification change region; and
sensing movement of a position of the selection icon displayed on the adjusted electronic map,
wherein at least one touch is continuously maintained, during receiving the touch input corresponding to the magnification change command, displaying the electronic map on the display, the sliding touch input moving toward the selection icon and sensing the movement of the position of the selection icon.

19. The method of claim 18, wherein the receiving of the input of the magnification change command comprises:
receiving touch inputs from two fingers held on the display and sensing the input of the magnification change command in response to the touch inputs from the two fingers; and
switching to movement mode, in response to sensing a release of at least one of the touch inputs of the two fingers to sensing a movement of a relative position of the selection icon.

* * * * *